United States Patent [19]
Graves et al.

[11] Patent Number: 5,790,693
[45] Date of Patent: Aug. 4, 1998

[54] CURRENCY DISCRIMINATOR AND AUTHENTICATOR

[75] Inventors: Bradford T. Graves, Arlington Heights; William J. Jones, Kenilworth; Douglas U. Mennie, Barrington; Frank M. Csulits, Gurnee, all of Ill.

[73] Assignee: Cummins-Allison Corp., Mt. Prospect, Ill.

[21] Appl. No.: 494,091

[22] Filed: Jun. 23, 1995

Related U.S. Application Data

[63] Continuation-in-part of Ser. No. 795,492, Nov. 21, 1991, abandoned, and a continuation-in-part of Ser. No. 317,349, Oct. 4, 1994, Pat. No. 5,640,463, and a continuation-in-part of Ser. No. 219,093, Mar. 29, 1994, abandoned, and a continuation-in-part of Ser. No. 127,334, Sep. 27, 1993, Pat. No. 5,467,405, which is a continuation of Ser. No. 885,648, May 19, 1992, Pat. No. 5,295,196, which is a continuation-in-part of Ser. No. 475,111, Feb. 5, 1990, abandoned.

[51] Int. Cl.$^6$ ................................ G06K 9/00
[52] U.S. Cl. ............... 382/135; 382/191; 382/209; 382/318; 382/320; 382/321
[58] Field of Search ................... 382/135, 165, 382/191, 209, 318, 320, 321, 322, 323; 250/556; 356/71; 235/379; 209/534

[56] References Cited

U.S. PATENT DOCUMENTS

| | | | |
|---|---|---|---|
| Re. 31,692 | 10/1984 | Tyburski et al. | 382/7 |
| D. 369,984 | 5/1996 | Larsen | D10/97 |
| 3,245,534 | 4/1966 | Smith et al. | 382/7 |
| 3,246,295 | 4/1966 | DeClaris et al. | 382/56 |
| 3,280,974 | 10/1966 | Riddle et al. | 209/111.8 |
| 3,480,785 | 11/1969 | Aufderheide | 250/219 |
| 3,496,370 | 2/1970 | Haville et al. | 250/219 |
| 3,509,535 | 4/1970 | Berube | 340/149 |
| 3,612,835 | 10/1971 | Andrews et al. | 235/61.11 D |
| 3,618,765 | 11/1971 | Cooper et al. | 209/534 |
| 3,679,314 | 7/1972 | Mustert | 356/71 |

(List continued on next page.)

FOREIGN PATENT DOCUMENTS

| | | |
|---|---|---|
| 0077464 | 4/1983 | European Pat. Off. . |
| 101115 | 2/1984 | European Pat. Off. . |
| 0338123 | 10/1989 | European Pat. Off. . |
| 0342647 | 11/1989 | European Pat. Off. . |

(List continued on next page.)

OTHER PUBLICATIONS

Mosler Inc. brochure "The Mosler/Toshiba CF-420", 1989.
AFB Currency Recognition System (not dated).
"Sale of Doubles Detection Jul. 1991)".
"Sale of Magnetic Detection Jul. 1991".
"Sale of Doubles Detection Jun. 1992".

(List continued on next page.)

*Primary Examiner*—Phuoc Tran
*Attorney, Agent, or Firm*—Arnold, White & Durkee

[57] ABSTRACT

A method of detecting counterfeit bills includes the steps of determining the denomination of the bill being evaluated, generating data corresponding to the concentration of magnetic ink on the bill and comparing this data to the expected concentration of magnetic ink on a genuine bill of the same denomination. The bill is considered genuine if the data is within an acceptable range of the expected value. An apparatus for detecting counterfeit currency employs a microprocessor to control an optical scanning operation of the bill being evaluated and to generate image data that is compared to stored images corresponding to genuine denominations of currency. The denomination of the bill is determined by evaluating the correspondence between the image data and the stored images. The microprocessor also controls measurement of the concentration of magnetic ink on the bill and determines the genuineness of the bill by comparing the measured concentration of magnetic ink to the expected concentration for a bill of the same denomination. A signal indicative of whether the bill is genuine or counterfeit is generated by the microprocessor depending on whether the data is within a predetermined range of the expected value.

25 Claims, 10 Drawing Sheets

U.S. PATENT DOCUMENTS

| | | | |
|---|---|---|---|
| 3,778,628 | 12/1973 | Novak et al. | 250/556 |
| 3,842,281 | 10/1974 | Goodrich | 250/461 |
| 3,870,629 | 3/1975 | Carter et al. | 209/111.8 |
| 3,906,449 | 9/1975 | Marchak | 340/149 R |
| 3,976,198 | 8/1976 | Carnes, Jr. et al. | 209/111.7 T |
| 4,041,456 | 8/1977 | Ott et al. | 340/146.3 R |
| 4,081,131 | 3/1978 | Sand et al. | |
| 4,096,991 | 6/1978 | Iguchi | 235/419 |
| 4,114,804 | 9/1978 | Jones et al. | 235/476 |
| 4,147,430 | 4/1979 | Gorgone et al. | 356/51 |
| 4,179,685 | 12/1979 | O'Maley | 340/146.3 |
| 4,250,806 | 2/1981 | Boyson et al. | 101/2 |
| 4,255,651 | 3/1981 | Phillips | 235/92 |
| 4,277,774 | 7/1981 | Fujii et al. | 340/146.3 |
| 4,283,708 | 8/1981 | Lee | 340/146.32 |
| 4,288,781 | 9/1981 | Sellner et al. | 340/146.3 |
| 4,302,781 | 11/1981 | Ikeda et al. | 358/486 |
| 4,311,914 | 1/1982 | Huber | 250/556 |
| 4,313,598 | 2/1982 | DiBlasio | 271/124 |
| 4,334,619 | 6/1982 | Horino et al. | 209/551 |
| 4,348,656 | 9/1982 | Gorgone et al. | 340/146.3 R |
| 4,349,111 | 9/1982 | Shah et al. | 209/534 |
| 4,355,300 | 10/1982 | Weber | 340/146.3 C |
| 4,356,473 | 10/1982 | Freudenthal | 340/146.3 H |
| 4,381,447 | 4/1983 | Horvath et al. | 250/223 |
| 4,386,432 | 5/1983 | Nakamira et al. | 382/7 |
| 4,442,541 | 4/1984 | Finkel et al. | 382/7 |
| 4,461,028 | 7/1984 | Okubo | 382/15 |
| 4,464,786 | 8/1984 | Nishito et al. | 382/7 |
| 4,464,787 | 8/1984 | Fish et al. | 382/7 |
| 4,470,496 | 9/1984 | Steiner | |
| 4,480,177 | 10/1984 | Allen | 235/379 |
| 4,482,058 | 11/1984 | Steiner | |
| 4,490,846 | 12/1984 | Ishida et al. | 382/7 |
| 4,503,963 | 3/1985 | Steiner | |
| 4,513,439 | 4/1985 | Gorgone et al. | 382/7 |
| 4,539,702 | 9/1985 | Oka | 382/7 |
| 4,542,829 | 9/1985 | Emery et al. | 209/534 |
| 4,556,140 | 12/1985 | Okada | 194/4 |
| 4,558,224 | 12/1985 | Gober | 250/460.1 |
| 4,563,771 | 1/1986 | Gorgone et al. | 382/7 |
| 4,567,370 | 1/1986 | Falls | 250/461.2 |
| 4,587,412 | 5/1986 | Apisdorf | 235/449 |
| 4,587,434 | 5/1986 | Roes et al. | 250/556 |
| 4,592,090 | 5/1986 | Curl et al. | 382/7 |
| 4,628,194 | 12/1986 | Dobbins et al. | 235/379 |
| 4,645,936 | 2/1987 | Gorgone | 250/556 |
| 4,653,647 | 3/1987 | Hashimoto | 209/534 |
| 4,677,682 | 6/1987 | Miyagawa et al. | 382/7 |
| 4,700,368 | 10/1987 | Munn et al. | 377/8 |
| 4,733,308 | 3/1988 | Nakamura et al. | 358/496 |
| 4,749,087 | 6/1988 | Buttifant | 382/7 |
| 4,817,176 | 3/1989 | Marshall et al. | |
| 4,823,393 | 4/1989 | Kawakami | 382/7 |
| 4,837,426 | 6/1989 | Pease et al. | |
| 4,881,268 | 11/1989 | Uchida et al. | 382/7 |
| 4,906,988 | 3/1990 | Copella | |
| 4,908,516 | 3/1990 | West | 250/556 |
| 4,973,851 | 11/1990 | Lee | 250/556 |
| 4,985,614 | 1/1991 | Pease et al. | 235/440 |
| 4,992,860 | 2/1991 | Hamaguchi et al. | 358/75 |
| 4,996,604 | 2/1991 | Ogawa et al. | 358/486 |
| 5,047,871 | 9/1991 | Meyer et al. | 358/486 |
| 5,068,519 | 11/1991 | Bryce | 235/449 |
| 5,074,415 | 12/1991 | Hara et al. | 382/135 |
| 5,122,754 | 6/1992 | Gotaas | 324/676 |
| 5,163,672 | 11/1992 | Mennie | 371/187 |
| 5,167,313 | 12/1992 | Dobbins et al. | 194/317 |
| 5,201,395 | 4/1993 | Takizawa et al. | 194/206 |
| 5,207,788 | 5/1993 | Geib et al. | 271/122 |
| 5,261,518 | 11/1993 | Bryce | 194/206 |
| 5,295,196 | 3/1994 | Raterman et al. | 382/7 |
| 5,304,813 | 4/1994 | DeMan | 250/556 |
| 5,341,408 | 8/1994 | Melcher et al. | 377/8 |
| 5,367,577 | 11/1994 | Gotaas | 382/135 |
| 5,430,664 | 7/1995 | Cargill et al. | 364/550 |
| 5,465,821 | 11/1995 | Akioka | 194/207 |
| 5,467,406 | 11/1995 | Graves et al. | 382/135 |
| 5,607,040 | 3/1997 | Mathurin, Sr. | 194/207 |
| 5,633,949 | 5/1997 | Graves et al. | 382/135 |

U.S. PATENT DOCUMENTS

| | | | |
|---|---|---|---|
| 0 718 809 A2 | 6/1996 | European Pat. Off. | |
| 2190996 | 12/1987 | United Kingdom | |
| WO90/07165 | 6/1990 | WIPO | |
| WO91/11778 | 8/1991 | WIPO | 382/7 |
| WO 92/17394 | 10/1992 | WIPO | |
| WO93/23824 | 11/1993 | WIPO | |
| WO 94/16412 | 7/1994 | WIPO | |
| WO 94/19773 | 9/1994 | WIPO | |
| WO 95/24691 | 9/1995 | WIPO | |
| WO 96/10800 | 4/1996 | WIPO | |
| WO 97/01155 | 1/1997 | WIPO | |

OTHER PUBLICATIONS

"Sale of Multiple Density Sensitivity Setting Apr. 1993".

"Sale of Multiple Magnetic Sensitivity Setting Apr. 1993".

"Offer for Sale of Optical/Magnetic Detection Sep. 1992".

Mosler CF–420 Cash Management System Operator's Manual, cover, copyright page, and chapter 5 pp. 5–1 through 5–16, copyrighted 1989.

JetScan Currency Scanner/Counter, Model 4060, Operator's Manual by Cummins–Allison (Aug. 1991).

Sale of JetScan Currency Scanner/Counter, Model 4060 (Aug. 1991).

JetScan Currency Scanner/Counter, Model 4061, Operating Instructions by Cummins–Allison (Apr. 20, 1993).

Sale of JetScan Currency Scanner/Counter, Model 4061 (Apr. 20, 1993).

JetScan Currency Scanner/Counter, Model 4062, Operating Instructions by Cummins–Allison (Nov. 28, 1994).

Sale of JetScan Currency Scanner/Counter, Model 4062 (Nov. 28, 1994).

AFB Currency Recognition System (1982).

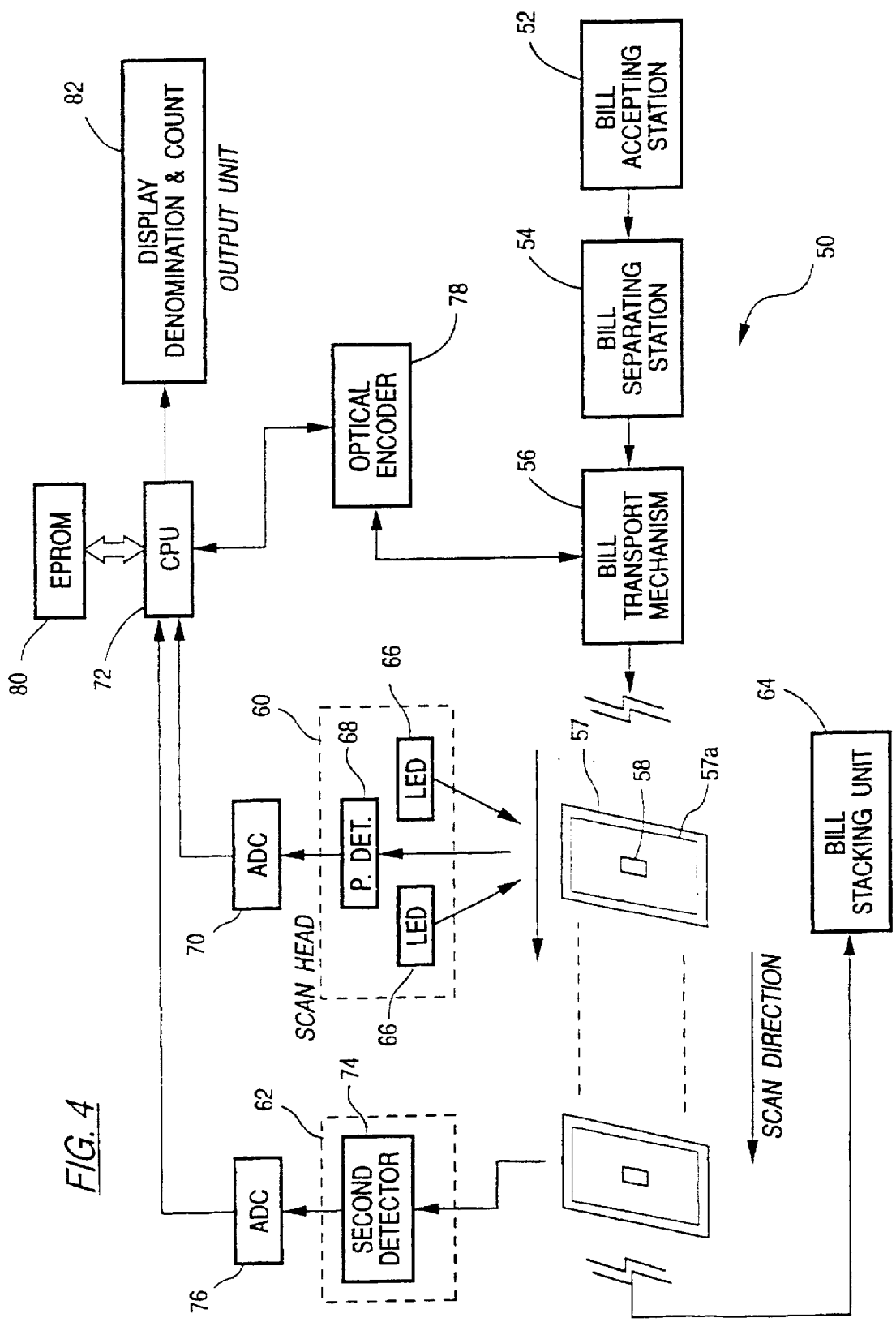

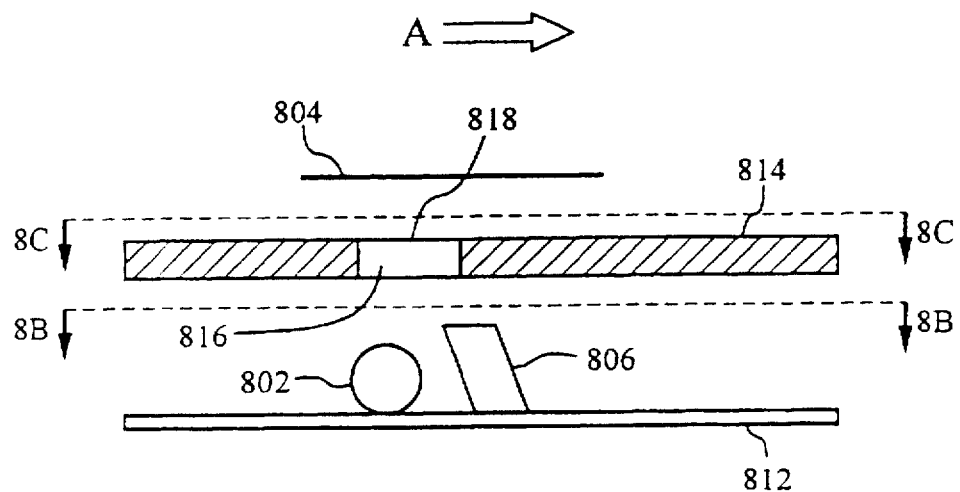
FIG. 8a
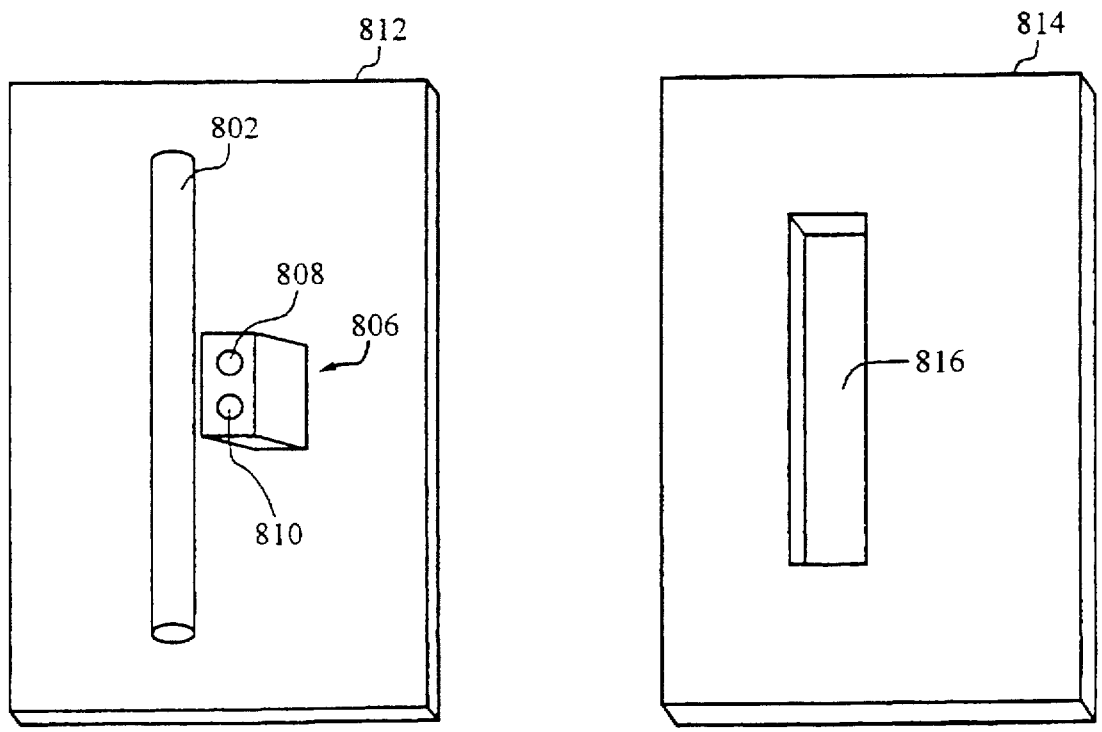
FIG. 8b
FIG. 8c

1

CURRENCY DISCRIMINATOR AND AUTHENTICATOR

CROSS-REFERENCES TO RELATED APPLICATIONS

This application is a continuation-in-part of U.S. patent applications Ser. No. 07/795,492 filed Nov. 21, 1991, for "Method and Apparatus for Counting Currency and Detecting Counterfeit Bills," abandoned, Ser. No. 08/317,349 filed Oct. 4, 1994, for "Method and Apparatus for Authenticating Documents Including Currency," U.S. Pat. No. 5,640,463, and Ser. No. 08/219,093 filed Mar. 29, 1994, for "Currency Discriminator and Authenticator;" abandoned. U.S. patent application Ser. No. 08/219,093 is a continuation-in-part of Ser. No. 08/127,334 filed Sep. 27, 1993, for "Method and Apparatus for Currency Discrimination and Counting," U.S. Pat. No. 5,467,405, which is a continuation of U.S. patent application Ser. No. 07/885,648, filed on May 19, 1992, and issued as U.S. Pat. No. 5,295,196, for "Method and Apparatus for Currency Discrimination and Counting," which is a continuation-in-part of abandoned U.S. patent application Ser. No. 07/475,111, filed Feb. 5, 1990, for "Method and Apparatus for Currency Discrimination and Counting."

FIELD OF THE INVENTION

The present invention relates, in general, to currency identification. More specifically, the present invention relates to an apparatus and method for discriminating currency bills of different denominations and/or authenticating the genuineness of the same.

SUMMARY OF THE INVENTION

It is a principal object of the present invention to provide an improved method and apparatus for identifying, authenticating, and counting currency bills comprising a plurality of currency denominations.

It is another object of this invention to provide an improved method and apparatus of the above kind which is capable of efficiently discriminating among, authenticating, and counting bills of several currency denominations at a high speed and with a high degree of accuracy.

It is another object of the present invention to provide an improved method and apparatus for authenticating documents which improves the ability of a system to accurately reject improper documents while reducing the likelihood of rejecting genuine documents.

Briefly, in accordance with the present invention, the objectives enumerated above are achieved by scanning a bill for first and second characteristic information, utilizing the first characteristic information to determine the denomination of a scanned bill, and using the second characteristic information to verify the genuineness of the bill. More particularly, a currency evaluation device, according to the present invention, comprises detection circuitry for detecting first and second characteristic information from a scanned bill, a memory for storing sets of genuine first and second characteristic information for a plurality of denominations of genuine bills, and signal processing means for comparing the detected first and second characteristic information with the stored genuine first and second characteristic information. The signal processing means performs a first comparison whereby the detected first characteristic information is compared with the stored sets of genuine first characteristic information. This first comparison results in either an indication of the denomination of the scanned bill or an error. The results of the first comparison are used to streamline a second comparison between detected and stored second characteristic information. The second comparison compares the detected second characteristic information with stored genuine second characteristic information corresponding to the denomination indicated by the first comparison. The second comparison results in either an indication of the genuineness of the scanned bill or an error.

One preferred embodiment of the present invention is a method of detecting counterfeit currency that includes the steps of determining the denomination of the bill being evaluated, generating data corresponding to the concentration of magnetic ink on the bill and comparing this data to the expected concentration of magnetic ink on a genuine bill of the same denomination. The bill is considered genuine if the data is within an acceptable range of an expected value.

The apparatus for implementing the above method employs a microprocessor to control an optical scanning operation of a bill and to generate image data that is compared to stored images corresponding to genuine denominations of currency. The denomination of the bill is determined by evaluating the similarity between the image data and the stored images of at least seven denominations of United States currency (one dollar, two dollars, five dollars, ten dollars, twenty dollars, fifty dollars and one hundred dollars). The microprocessor also controls measurement of data corresponding to the concentration of magnetic ink on the bill and determines the genuineness of the bill by comparing the measured concentration of magnetic ink to the expected concentration for a bill of the same denomination. A signal indicative of whether the bill is genuine or counterfeit is generated by the microprocessor depending on whether the data is within a predetermined range of the expected value.

According to one embodiment a document to be authenticated is illuminated with ultraviolet light and the amount of ultraviolet light which is reflected off the document is measured. Based on the amount of ultraviolet light which is detected, the document is either authenticated or rejected. In the case of documents being authenticated relative to United States currency, a bill is rejected if a high level of reflected ultraviolet light is not detected.

In another embodiment, a document is illuminated with ultraviolet light and both the amount of reflected ultraviolet light and the amount of emitted visible light are measured. Based on the amount of ultraviolet light detected and the amount of visible light detected, a document is either authenticated or rejected. In the case of documents being authenticated relative to United States currency, a bill is rejected if either a high level of reflected ultraviolet light is not detected or even a low level of visible light is detected.

It is known that some counterfeit United States bills fluoresce, or emit visible light, when illuminated by ultraviolet light. As genuine United States currency does not fluoresce, the emission of visible light has been employed as a means of detecting counterfeit United States currency. However, it has been found that not all counterfeit United States bills fluoresce; and hence, such counterfeits will not be detected by the above described fluorescence test.

It has been found that genuine United States currency reflects a high level of ultraviolet light when illuminated by an ultraviolet light source. It has also been found that some counterfeit United States bills do not reflect a high level of ultraviolet light. Such counterfeit bills may or may not also fluoresce under ultraviolet light. The present invention employs an authentication test wherein the amount of reflected ultraviolet light is measured and a bill is rejected if it does not reflect a high amount of ultraviolet light. By employing such a test, counterfeit United States bills which do not reflect a high level of ultraviolet light may be properly rejected.

While not all counterfeit United States bills fail to reflect a high level of ultraviolet light and hence not all counterfeit United States bills will be detected using this test, the present invention provides an additional means for detecting counterfeit bills which might otherwise go undetected. Furthermore, the likelihood of a counterfeit United States bill going undetected may be further reduced by employing an alternative embodiment of the present invention wherein both the amount of reflected ultraviolet light and the amount of emitted visible light are measured. In such a system, a bill is rejected as counterfeit if either it fails to reflect a high level of ultraviolet light or it fluoresces.

The above described embodiments may be adapted to authenticate currencies from other countries and other types of documents such as food stamps and checks. For instance some genuine documents may be designed to reflect ultraviolet light only in certain locations and/or in a predetermined pattern. An alternative embodiment of the present invention may be designed to accept documents which exhibit similar characteristics while rejecting those which do not. Likewise, an alternative embodiment of the present invention may be employed to authenticate documents based on both their characteristics with respect to reflected ultraviolet light and their characteristics with respect to fluorescent emissions, e.g., detecting the amount, location, and/or pattern of fluorescent emissions.

BRIEF DESCRIPTION OF THE DRAWINGS

Other objects and advantages of the invention will become apparent upon reading the following detailed description in conjunction with the drawings in which:

FIG. 4 is a functional block diagram illustrating a currency discriminating and authenticating system according to the present invention;

FIG. 8a is a side view of a preferred embodiment of a document authenticating system according to the present invention;

FIG. 8b is a top view of the preferred embodiment of FIG. 8a along the direction 8b;

FIG. 8c is a top view of the preferred embodiment of FIG. 8a along the direction 8c.

DETAILED DESCRIPTION OF THE PREFERRED EMBODIMENTS

Figure 1:
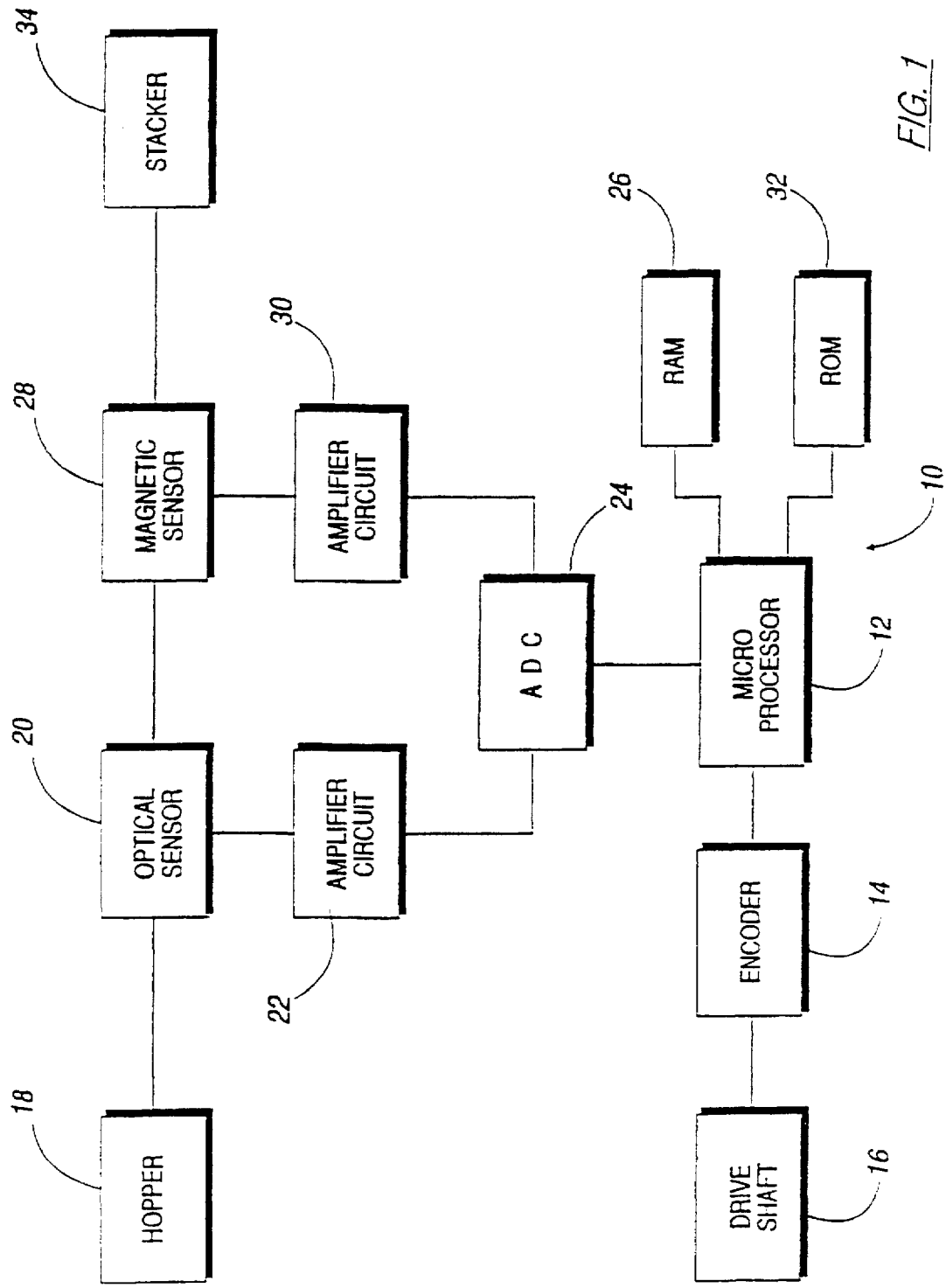
FIG. 1 is a block diagram of one embodiment of a system for detecting counterfeit currency according to the present invention.

Referring to the drawings, FIG. 1 shows a block diagram of a counterfeit detector 10. A microprocessor 12 controls the overall operation of the counterfeit detector 10. It should be noted that the detailed construction of a mechanism to convey bills through the counterfeit detector 10 is not related to the practice of the present invention. Many configurations are well-known in the prior art. An exemplary configuration includes an arrangement of pulleys and rubber belts driven by a single motor. An encoder 14 may be used to provide input to the microprocessor 12 based on the position of a drive shaft 16, which operates the bill-conveying mechanism. The input from the encoder 14 allows the microprocessor to calculate the position of a bill as it travels and to determine the timing of the operations of the counterfeit detector 10.

A stack of currency (not shown) may be deposited in a hopper 18 which holds the currency securely and allows the bills in the stack to be conveyed one at a time through the counterfeit detector 10. After the bills are conveyed to the interior of the counterfeit detector 10, a portion of the bill is optically scanned by an optical sensor 20 of the type commonly known in the art. The optical sensor generates signals that correspond to the amount of light reflected by a small portion of the bill. Signals from the optical sensor 20 are sent to an amplifier circuit 22, which, in turn, sends an output to an analog-to-digital convertor 24. The output of the ADC is read by the microprocessor 12. The microprocessor 12 stores each element of data from the optical sensor 20 in a range of memory locations in a random access memory ("RAM") 26, forming a set of image data that corresponds to the object scanned.

As the bill continues its travel through the counterfeit detector 10, it is passed adjacent to a magnetic sensor 28, which detects the presence of magnetic ink. The magnetic sensor 28 desirably makes a plurality of measurements along a path parallel to one edge of the bill being examined. For example, the path sensed by the magnetic sensor 28 may be parallel to the shorter edges of the bill and substantially through the bill's center. The output signal from the magnetic sensor 28 is amplified by an amplifier circuit 30 and digitized by the ADC 24. The digital value of each data point measured by the magnetic sensor 28 is read by the microprocessor 12, whereupon it is stored in a range of memory in the RAM 26.

The digitized magnetic data may be mathematically manipulated to simplify its use. For example, the value of all data points may be summed to yield a checksum, which may be used for subsequent comparison to expected values computed from samples of genuine bills. As will be apparent, calculation of a checksum for later comparison eliminates the need to account for the orientation of the bill with respect to the magnetic sensor 28. This is true because the checksum represents the concentration of magnetic ink across the entire path scanned by the magnetic sensor 28, regardless of variations caused by higher concentrations in certain regions of the bill.

The image data stored in the RAM 26 is compared by the microprocessor 12 to standard image data stored in a read only memory ("ROM") 32. The stored image data corresponds to optical data generated from genuine currency of a plurality of denominations. The ROM image data may represent various orientations of genuine currency to account for the possibility of a bill in the stack being in a reversed orientation compared to other bills in the stack. If the image data generated by the bill being evaluated does not fall within an acceptable limit of any of the images stored in ROM, the bill is determined to be of an unknown denomination. The machine stops to allow removal of the document from the stack of currency.

If the image data from the bill being evaluated corresponds to one of the images stored in the ROM 32, the microprocessor 12 compares the checksum of the magnetic data to one of a plurality of expected checksum values stored in the ROM 32. An expected checksum value is stored for each denomination that is being counted. The value of each expected checksum is determined, for example, by averaging the magnetic data from a number of genuine samples of each denomination of interest. If the value of the measured checksum is within a predetermined range of the expected checksum, the bill is considered to be genuine. If the checksum is not within the acceptable range, the operator is signalled that the document is suspect and the operation of the counterfeit detector 10 is stopped to allow its retrieval.

If the bill passes both the optical evaluation and the magnetic evaluation, it exits the counterfeit detector 10 to a stacker 34. Furthermore, the counterfeit detector 10 may desirably include the capability to maintain a running total of genuine currency of each denomination.

It should be noted that the magnetic checksum is only compared to the expected checksum for a single denomination (i.e. the denomination that the optical data comparison has indicated). Thus, the only way in which a bill can be classified as genuine is if its magnetic checksum is within an acceptable range for its specific denomination. For a counterfeit bill to be considered genuine by the counterfeit detector of the present invention, it would have to be within an acceptable range in the denomination-discriminating optical comparison and have a distribution of magnetic ink within an acceptable range for its specific denomination.

To summarize the operation of the system, a stack of bills is fed into the hopper 18. Each bill is transported adjacent to the optical sensor 20, which generates image data corresponding to one side of the bill. The bill is also scanned by a magnetic sensor 28 and a plurality of data points corresponding to the presence of magnetic ink are recorded by the microprocessor 12. A checksum is generated by adding the total of all magnetic data points. The image data generated by the optical sensor 20 is compared to stored images that correspond to a plurality of denominations of currency. When the denomination of the bill being evaluated has been determined, the checksum is compared to a stored checksum corresponding to a genuine bill of that denomination. The microprocessor 12 generates a signal indicating that the bill is genuine or counterfeit depending on whether said data is within a predetermined range of the expected value. Bills exit the counterfeit detector 10 and are accumulated in the stacker 34.

Figure 2:
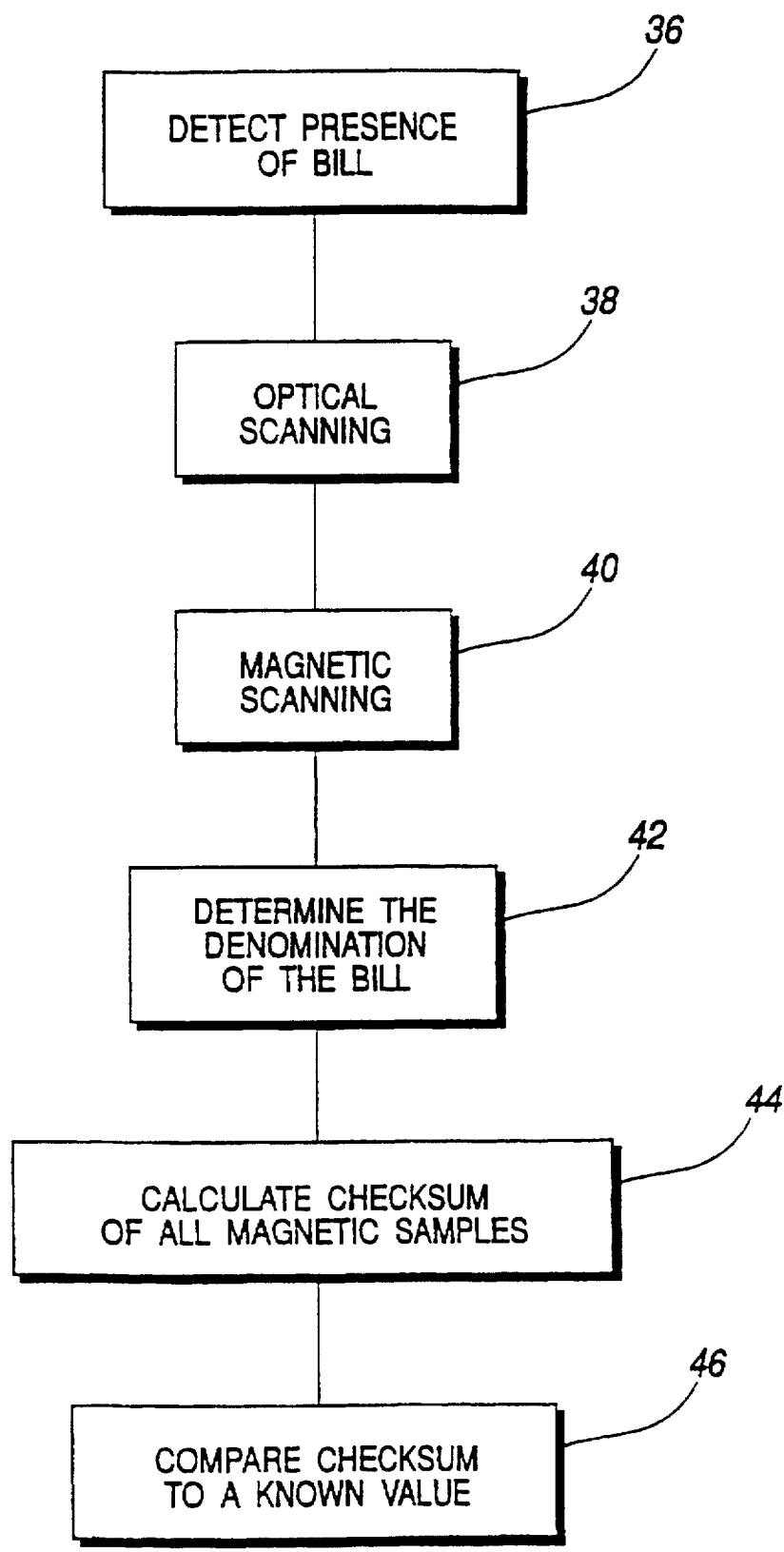
FIG. 2 is a flow diagram that illustrates the operation of the counterfeit detector of the present invention.

FIG. 2 is a flow diagram of an exemplary system embodying the present invention. At step 36, the presence of a bill approaching the optical sensor 20 is detected by the microprocessor 12, which initiates an optical scanning operation 38. Image data generated by the optical scanning operation are stored in RAM 26. The number of optical samples taken is not critical to the operation of the present invention, but the probability of accurate classification of the denomination of a bill increases as the number of samples increases.

At step 40, the microprocessor 12 initiates the magnetic scanning operation. The data points obtained by the magnetic scanning operation may be stored in the RAM 26 and added together later to yield a checksum, as shown in step 44. Alternatively, the checksum may be calculated by keeping a running total of the magnetic data values by adding each newly acquired value to the previous total. As with the optical scanning operation, the number of data points measured is not essential, but the chances of accurately identifying a counterfeit bill based on the concentration of magnetic ink improve as the number of samples increases. At step 42, the microprocessor determines the denomination of the bill by comparing the image data to a plurality of known images, each of which corresponds to a specific denomination of currency. The bill is identified as belonging to the denomination corresponding to one of the known scan patterns if the correlation between the two is within an acceptable range. At step 46, the checksum resulting from the summation of the magnetic data points is compared to an expected value for a genuine bill of the denomination identified by the comparison of the image data to the stored data.

The expected value may be determined in a variety of ways. One method is to empirically measure the concentration of magnetic ink on a sample of genuine bills and average the measured concentrations. Another method is to program the microprocessor to periodically update the expected value based on magnetic data measurements of bills evaluated by the counterfeit detector over a period of time.

If the checksum of the bill being evaluated is within a predetermined range of the expected value, the bill is considered to be genuine. Otherwise, the bill is considered to be counterfeit. As will be apparent, the choice of an acceptable variation from the expected checksum determines the sensitivity of the counterfeit detector. If the range chosen is too narrow, the possibility that a genuine bill will be classified as counterfeit is increased. On the other hand, the possibility that a counterfeit bill will be classified as genuine increases if the acceptable range is too broad.

Figure 3:
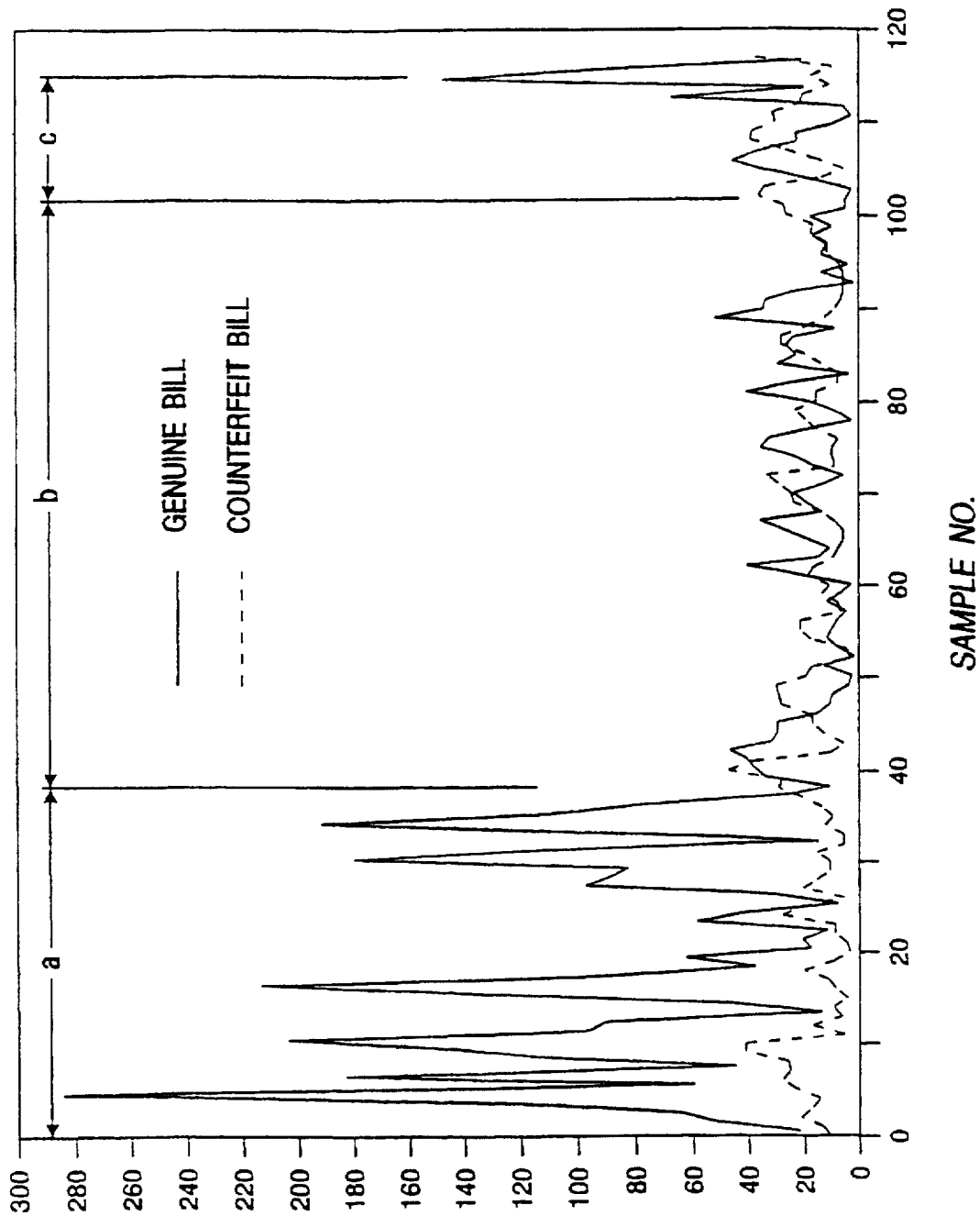
FIG. 3 is a graphical representation of the magnetic data points generated by both a genuine one hundred dollar bill and a counterfeit one hundred dollar bill.

FIG. 3 is a graphical representation of the magnetic data points generated by both a genuine one hundred dollar bill (solid line) and a counterfeit one hundred dollar bill (broken line). As previously noted, bills are desirably scanned along a path that is parallel to one of their short edges. The graph shown in FIG. 3 shows magnetic data obtained by scanning a path passing approximately through the center of the bill. The measurements in the region designated "a" correspond to the area at the top of the bill. The area designated "b" corresponds to the central region of the bill and the region designated "c" corresponds to the bottom of the bill. The magnetic measurements for the genuine bill are relatively high in region a because of the high concentration of magnetic ink near the top of the bill. The concentration of magnetic ink in region b is relatively small and the concentration in region c is generally between the concentrations in regions a and c.

It should be noted that the concentration of magnetic ink in a typical counterfeit bill is uniformly low. Thus, the sum of the all data points for a counterfeit bill is generally significantly lower than for a genuine bill. Nonetheless, as counterfeiting techniques become more sophisticated, the correlation between genuine bills and counterfeits has improved.

The system described above increases the chances of identifying a counterfeit bill because the denomination of a bill being evaluated is determined prior to the evaluation of the bill for genuineness. The checksum of the bill being evaluated is only compared to the expected checksum for a bill of that denomination. The process of identifying the denomination of the bill prior to evaluating it for genuineness minimizes the chance that a "good" counterfeit will generate a checksum indicative of a genuine bill of any denomination.

Referring next to FIG. 4, there is shown a functional block diagram illustrating a preferred embodiment of a currency discriminating and authenticating system 50 which includes a bill accepting station 52 where stacks of currency bills that need to be identified, authenticated, and counted are positioned. Accepted bills are acted upon by a bill separating station 54 which functions to pick out or separate one bill at a time for being sequentially relayed by a bill transport mechanism 56, according to a precisely predetermined transport path, across two scanheads 60 and 62 where the currency denomination of the bill is identified and the genuineness of the bill is authenticated. In the preferred embodiment depicted, the scanhead 60 is an optical scanhead that scans for a first type of characteristic information from a scanned bill 57 which is used to identify the bill's denomination. The second scanhead 62 scans for a second type of characteristic information from the scanned bill 57. While in the illustrated preferred embodiment scanheads 60 and 62 are separate and distinct, it is understood that these may be incorporated into a single scanhead. For example, where the first characteristic sensed is intensity of reflected light and the second characteristic sensed is color, a single optical scanhead having a plurality of detectors, one or more without filters and one or more with colored filters, may be employed (U.S. Pat. No. 4,992,860 incorporated herein by reference). The scanned bill is then transported to a bill stacking station 64 where bills so processed are stacked for subsequent removal.

The optical scanhead 60 of the preferred embodiment depicted in FIG. 4 comprises at least one light source 66 directing a beam of coherent light downwardly onto the bill transport path so as to illuminate a substantially rectangular light strip 58 upon a currency bill 57 positioned on the transport path below the scanhead 60. Light reflected off the illuminated strip 58 is sensed by a photodetector 68 positioned directly above the strip. The analog output of the photodetector 68 is converted into a digital signal by means of an analog-to-digital (ADC) convertor unit 70 whose output is fed as a digital input to a central processing unit (CPU) 72.

The second scanhead 62 comprises at least one detector 74 for sensing a second type of characteristic information from a bill. The analog output of the detector 74 is converted into a digital signal by means of a second analog to digital converter 76 whose output is also fed as a digital input to the central processing unit (CPU) 72.

While scanhead 60 in the preferred embodiment of FIG. 4 is an optical scanhead, it should be understood that the first and second scanheads 60 and 62 may be designed to detect a variety of characteristic information from currency bills. Additionally these scanheads may employ a variety of detection means such as magnetic or optical sensors. For example, a variety of currency characteristics can be measured using magnetic sensing. These include detection of patterns of changes in magnetic flux (U.S. Pat. No. 3,280,974), patterns of vertical grid lines in the portrait area of bills (U.S. Pat. No. 3,870,629), the presence of a security thread (U.S. Pat. No. 5,151,607), total amount of magnetizable material of a bill (U.S. Pat. No. 4,617,458), patterns from sensing the strength of magnetic fields along a bill (U.S. Pat. No. 4,593,184), and other patterns and counts from scanning different portions of the bill such as the area in which the denomination is written out (U.S. Pat. No. 4,356,473).

With regard to optical sensing, a variety of currency characteristics can be measured such as detection of density (U.S. Pat. No. 4,381,447), color (U.S. Pat. Nos. 4,490,846; 3,496,370; 3,480,785), length and thickness (U.S. Pat. No. 4,255,651), the presence of a security thread (U.S. Pat. No. 5,151,607) and holes (U.S. Pat. No. 4,381,447), and other patterns of reflectance and transmission (U.S. Pat. Nos. 3,496,370; 3,679,314; 3,870,629; 4,179,685). Color detection techniques may employ color filters, colored lamps, and/or dichroic beamsplitters (U.S. Pat. Nos. 4,841,358; 4,658,289; 4,716,456; 4,825,246, 4,992,860 and EP 325,364). An optical sensing system using ultraviolet light is described in the assignee's copending U.S. patent application Ser. No. 08/317,349, filed Oct. 4, 1994, and incorporated herein by reference, and described below.

In addition to magnetic and optical sensing, other techniques of detecting characteristic information of currency include electrical conductivity sensing, capacitive sensing (U.S. Pat. Nos. 5,122,754 [watermark, security thread]; 3,764,899 [thickness]; 3,815,021 [dielectric properties]; 5,151,607 [security thread]), and mechanical sensing (U.S. Pat. No. 4,381,447 [limpness]; 4,255,651 [thickness]).

Referring again to FIG. 4, the bill transport path is defined in such a way that the transport mechanism 56 moves currency bills with the narrow dimension of the bills parallel to the transport path and the scan direction. Alternatively, the system 50 may be designed to scan bills along their long dimension or along a skewed dimension. As a bill 57 moves on the transport path on the scanhead 60, the coherent light strip 58 effectively scans the bill across the narrow dimension of the bill. In the preferred embodiment depicted, the transport path is so arranged that a currency bill 57 is scanned by scanhead 60 approximately about the central section of the bill along its narrow dimension, as best shown in FIG. 4. The scanhead 60 functions to detect light reflected from the bill as it moves across the illuminated light strip 58 and to provide an analog representation of the variation in light so reflected which, in turn, represents the variation in the dark and light content of the printed pattern or indicia on the surface of the bill. This variation in light reflected from the narrow dimension scanning of the bills serves as a measure for distinguishing, with a high degree of confidence, among a plurality of currency denominations which the system of this invention is programmed to handle.

A series of such detected reflectance signals are obtained across the narrow dimension of the bill, or across a selected segment thereof, and the resulting analog signals are digitized under control of the CPU 72 to yield a fixed number of digital reflectance data samples. The data samples are then subjected to a digitizing process which includes a normalizing routine for processing the sampled data for improved correlation and for smoothing out variations due to "contrast" fluctuations in the printed pattern existing on the bill surface. The normalized reflectance data so digitized represents a characteristic pattern that is fairly unique for a given bill denomination and provides sufficient distinguishing features between characteristic patterns for different currency denominations. This process is more fully explained in U.S. patent application Ser. No. 07/885,648, filed on May 19, 1992, now issued as U.S. Pat. No. 5,295,196 for "Method and Apparatus for Currency Discrimination and Counting," which is incorporated herein by reference in its entirety.

In order to ensure strict correspondence between reflectance samples obtained by narrow dimension scanning of successive bills, the initiation of the reflectance sampling process is preferably controlled through the CPU 72 by means of an optical encoder 78 which is linked to the bill transport mechanism 56 and precisely tracks the physical movement of the bill 57 across the scanheads 60 and 62. More specifically, the optical encoder 78 is linked to the rotary motion of the drive motor which generates the movement imparted to the bill as it is relayed along the transport path. In addition, the mechanics of the feed mechanism (not shown, see U.S. Pat. No. 5,295,196 referred to above) ensure that positive contact is maintained between the bill and the transport path, particularly when the bill is being scanned by scanheads 60 and 62. Under these conditions, the optical encoder 78 is capable of precisely tracking the movement of the bill 57 relative to the light strip 58 generated by the scanhead 60 by monitoring the rotary motion of the drive motor.

The output of photodetector 68 is monitored by the CPU 72 to initially detect the presence of the bill underneath the scanhead 60 and, subsequently, to detect the starting point of the printed pattern on the bill, as represented by the thin borderline 57a which typically encloses the printed indicia on currency bills. Once the borderline 57a has been detected, the optical encoder 78 is used to control the timing and number of reflectance samples that are obtained from the output of the photodetector 68 as the bill 57 moves across the scanhead 60 and is scanned along its narrow dimension.

The detection of the borderline 57a serves as an absolute reference point for initiation of sampling. If the edge of a bill were to be used as a reference point, relative displacement of sampling points can occur because of the random manner in which the distance from the edge to the borderline 57a varies from bill to bill due to the relatively large range of tolerances permitted during printing and cutting of currency bills. As a result, it becomes difficult to establish direct correspondence between sample points in successive bill scans and the discrimination efficiency is adversely affected.

The use of the optical encoder 78 for controlling the sampling process relative to the physical movement of a bill 57 across the scanhead 60 is also advantageous in that the encoder 78 can be used to provide a predetermined delay following detection of the borderline prior to initiation of samples. The encoder delay can be adjusted in such a way that the bill 57 is scanned only across those segments along its narrow dimension which contain the most distinguishable printed indicia relative to the different currency denominations.

In the case of U.S. currency, for instance, it has been determined that the central, approximately two-inch portion of currency bills, as scanned across the central section of the narrow dimension of the bill, provides sufficient data for distinguishing among the various U.S. currency denominations on the basis of the correlation technique disclosed in U.S. Pat. No. 5,295,196 referred to above. Accordingly, the optical encoder can be used to control the scanning process so that reflectance samples are taken for a set period of time and only after a certain period of time has elapsed since the borderline 57a has been detected, thereby restricting the scanning to the desired central portion of the narrow dimension of the bill.

Figure 5A:
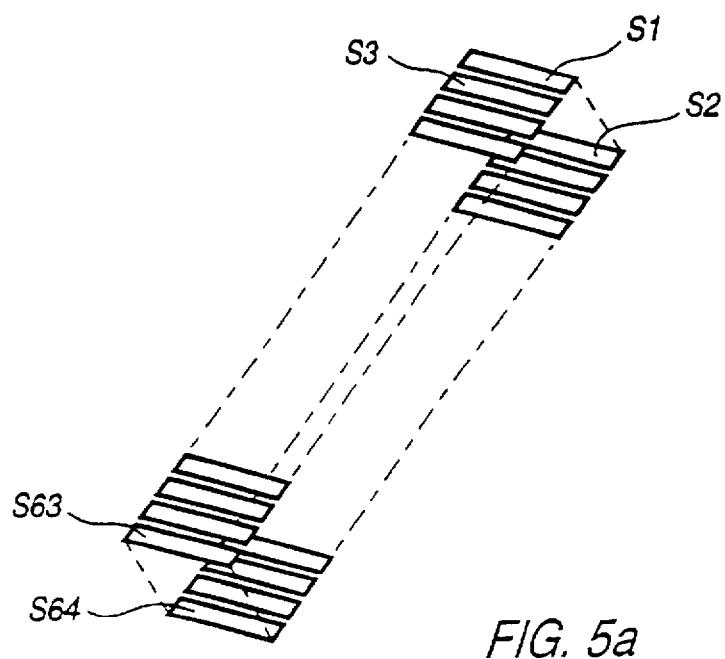
FIG. 5a is a diagrammatic perspective illustration of the successive areas scanned during the traversing movement of a single bill across an optical sensor in the system of FIG. 4.
Figure 5B:
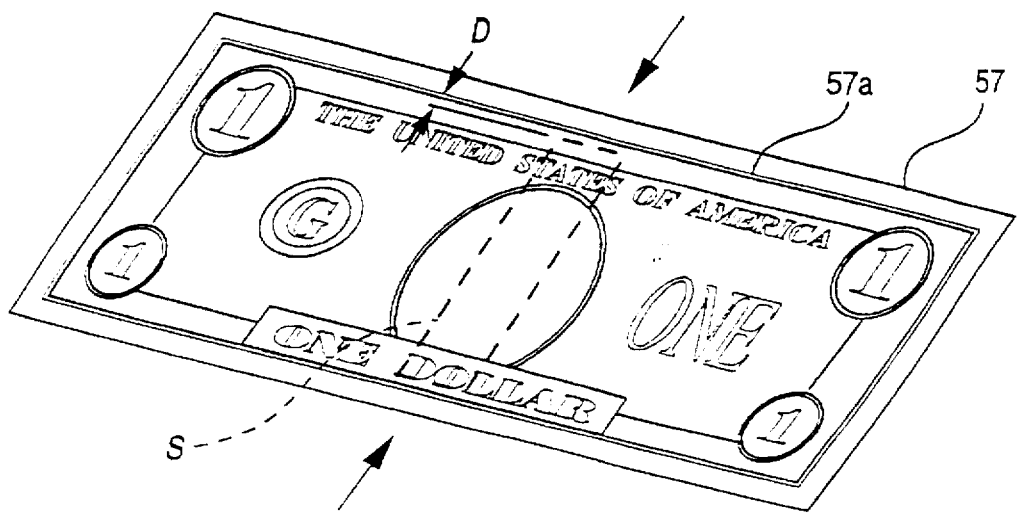
FIG. 5b is a perspective view of a bill and a preferred area to be optically scanned on the bill.
Figure 5C:
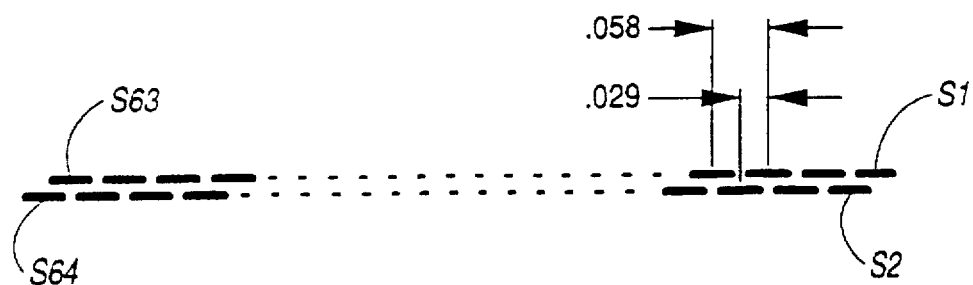
FIG. 5c is a diagrammatic side elevation of the scan area to be optically scanned on a bill.

FIGS. 5a–5c illustrate the scanning process of scanhead 60 in more detail. Referring to FIG. 5b, as a bill 57 is advanced in a direction parallel to the narrow edges of the bill, scanning via a wide slit in the scanhead 60 is effected along a segment S of the central portion of the bill 57. This segment S begins a fixed distance D inboard of the border line 57a. As the bill 57 traverses the scanhead 60, a strip s of the segment S is always illuminated, and the photodetector 68 produces a continuous output signal which is proportional to the intensity of the light reflected from the illuminated strip s at any given instant. This output is sampled at intervals controlled by the encoder, so that the sampling intervals are precisely synchronized with the movement of the bill across the scanhead 60.

As illustrated in FIGS. 5a and 5c, it is preferred that the sampling intervals be selected so that the strips s that are illuminated for successive samples overlap one another. The odd-numbered and even-numbered sample strips have been separated in FIGS. 5a and 5c to more clearly illustrate this overlap. For example, the first and second strips s1 and s2 overlap each other, the second and third strips s2 and s3 overlap each other, and so on. Each adjacent pair of strips overlap each other. In the illustrative example, this is accomplished by sampling strips that are 0.050 inch wide at 0.029 inch intervals, along a segment S that is 1.83 inch long (64 samples).

The optical sensing and correlation technique is based upon using the above process to generate a series of stored intensity signal patterns using genuine bills for each denomination of currency that is to be detected. According to a preferred embodiment, two or four sets of stored intensity signal samples are generated and stored within system memory, preferably in the form of an EPROM 80 (see FIG. 4), for each detectable currency denomination. The sets of stored intensity signal samples for each bill are generated from optical scans, performed on the green surface of the bill and taken along both the "forward" and "reverse" directions relative to the pattern printed on the bill. Alternatively, the optical scanning may be performed on the black side of U.S. currency bills or on either surface of foreign bills.

In adapting this technique to U.S. currency, for example, sets of stored intensity signal samples are generated and stored for seven different denominations of U.S. currency, i.e., $1, $2, $5, $10, $20, $50 and $100. More specifically, four sets of stored intensity signal samples are generated for the $10 bill and the $2 bill, and two sets of stored intensity signal samples are generated for each of the other denominations. Accordingly, a master set of 18 different sets of stored intensity signal samples is stored within the system memory for subsequent correlation purposes. Once the master set has been stored, the scanned first characteristic information, in this example being reflected light intensity signal samples, generated by scanning a bill under test is compared by the CPU 72 with each of the 18 sets of stored intensity signal samples to generate, for each comparison, a correlation number representing the extent of correlation, i.e., similarity between corresponding ones of the plurality of data samples, for the sets of data being compared.

The CPU 72 is programmed to identify the denomination of the scanned bill as corresponding to the set of stored intensity signal samples for which the correlation number resulting from pattern comparison is found to be the highest. In order to preclude the possibility of mischaracterizing the denomination of a scanned bill, as well as to reduce the possibility of spurious notes being identified as belonging to a valid denomination, a bi-level threshold of correlation is used as the basis for making a "positive" call. Such a method is disclosed in U.S. Pat. No. 5,295,196 referred to above.

As a result of the first comparison described above based on the reflected light intensity information retrieved by scanhead 60, the CPU 72 will have either determined the denomination of the scanned bill 57 or determined that the first scanned signal samples fail to sufficiently correlate with any of the sets of stored intensity signal samples in which case an error is generated. Provided that an error has not been generated as a result of this first comparison based on reflected light intensity characteristics, a second comparison is performed. This second comparison is performed based on a second type of characteristic information, such as alternate reflected light properties, similar reflected light properties at alternate locations of a bill, light transmissivity properties, various magnetic properties of a bill, the presence of a security thread embedded within a bill, the color of a bill, the thickness or other dimension of a bill, etc. The second type of characteristic information is retrieved from a scanned bill by the second scanhead 62. The scanning and processing by scanhead 62 may be controlled in a manner similar to that described above with regard to scanhead 60.

In addition to the sets of stored first characteristic information, in this example stored intensity signal samples, the EPROM 80 stores sets of stored second characteristic information for genuine bills of the different denominations which the system 50 is capable of handling. Based on the denomination indicated by the first comparison, the CPU 72 retrieves the set or sets of stored second characteristic data for a genuine bill of the denomination so indicated and compares the retrieved information with the scanned second characteristic information. If sufficient correlation exists between the retrieved information and the scanned information, the CPU 72 verifies the genuineness of the scanned bill 57. Otherwise, the CPU generates an error. While the preferred embodiment illustrated in FIG. 4 depicts a single CPU 72 for making comparisons of first and second characteristic information and a single EPROM 80 for storing first and second characteristic information, it is understood that two or more CPUs and/or EPROMs could be used, including one CPU for making first characteristic information comparisons and a second CPU for making second characteristic information comparisons.

Using the above sensing and correlation approach, the CPU 72 is programmed to count the number of bills belonging to a particular currency denomination whose genuineness has been verified as part of a given set of bills that have been scanned for a given scan batch, and to determine the aggregate total of the currency amount represented by the bills scanned during a scan batch. The CPU 72 is also linked to an output unit 82 which is adapted to provide a display of the number of genuine bills counted, the breakdown of the bills in terms of currency denomination, and the aggregate total of the currency value represented by counted bills. The output unit 82 can also be adapted to provide a print-out of the displayed information in a desired format.

Figure 6A:
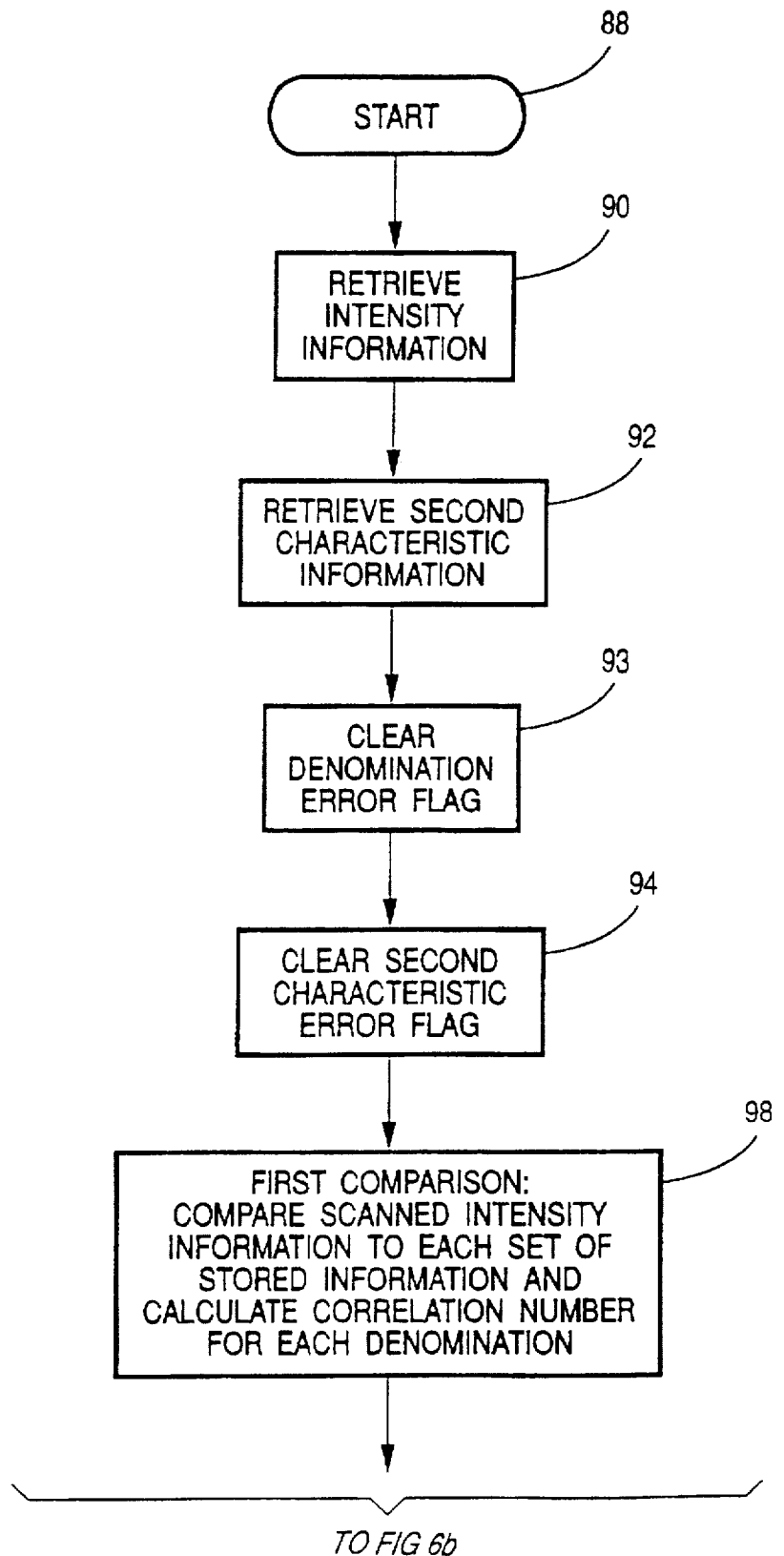
FIGS. 6a and 6b comprise a flowchart illustrating the sequence of operations involved in implementing the discrimination and authentication system of FIG. 4.
Figure 6B:
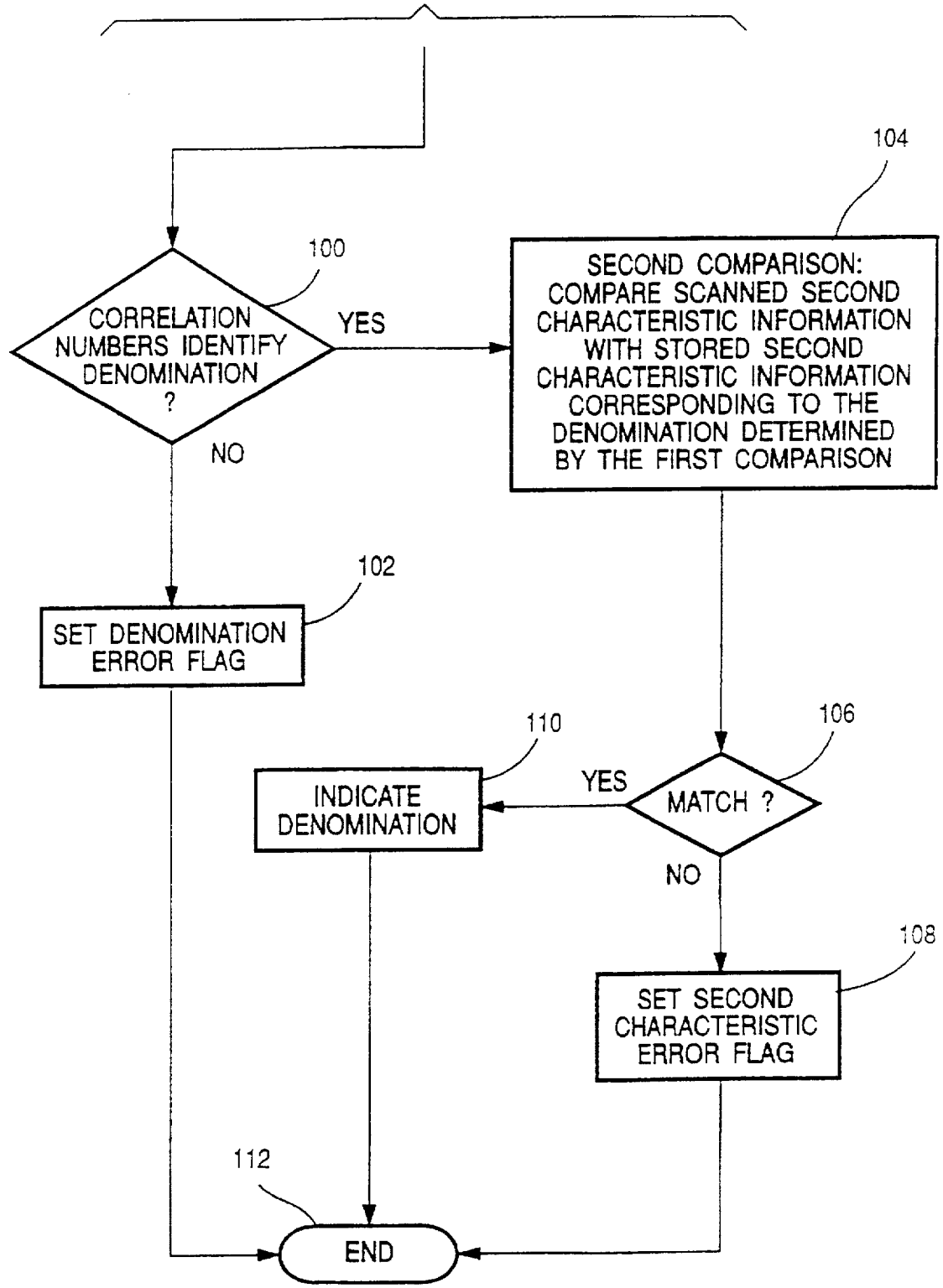

The interrelation between the use of the first and second type of characteristic information can be seen by considering FIGS. 6a and 6b which comprise a flowchart illustrating the sequence of operations involved in implementing a discrimination and authentication system according to a preferred embodiment of the present invention. Upon the initiation of the sequence of operations (step 88), reflected light intensity information is retrieved from a bill being scanned (step 90). Similarly, second characteristic information is also retrieved from the bill being scanned (step 92). Denomination error and second characteristic error flags are cleared (steps 93 and 94).

Next the scanned intensity information is compared to each set of stored intensity information corresponding to genuine bills of all denominations the system is programmed to accommodate (step 98). For each denomination, a correlation number is calculated. The system then, based on the correlation numbers calculated, determines either the denomination of the scanned bill or generates a denomination error by setting the denomination error flag (steps 100 and 102). In the case where the denomination error flag is set (step 102), the process is ended (step 112). Alternatively, if based on this first comparison, the system is able to determine the denomination of the scanned bill, the system proceeds to compare the scanned second characteristic information with the stored second characteristic information corresponding to the denomination determined by the first comparison (step 104).

For example, if as a result of the first comparison the scanned bill is determined to be a $20 bill, the scanned second characteristic information is compared to the stored second characteristic information corresponding to a genuine $20 bill. In this manner, the system need not make comparisons with stored second characteristic information for the other denominations the system is programmed to accommodate. If based on this second comparison (step 104) it is determined that the scanned second characteristic information does not sufficiently match that of the stored second characteristic information (step 106), then a second characteristic error is generated by setting the second characteristic error flag (step 108) and the process is ended (step 112). If the second comparison results in a sufficient match between the scanned and stored second characteristic information (step 106), then the denomination of the scanned bill is indicated (step 110) and the process is ended (step 112).

TABLE 1

| Sensitivity Denomination | 1 | 2 | 3 | 4 | 5 |
| --- | --- | --- | --- | --- | --- |
| $1 | 200 | 250 | 300 | 375 | 450 |
| $2 | 100 | 125 | 150 | 225 | 300 |
| $5 | 200 | 250 | 300 | 350 | 400 |
| $10 | 100 | 125 | 150 | 200 | 250 |
| $20 | 120 | 150 | 180 | 270 | 360 |
| $50 | 200 | 250 | 300 | 375 | 450 |
| $100 | 100 | 125 | 150 | 250 | 350 |

An example of an interrelationship between authentication based on a first and second characteristic can be seen by considering Table 1. Table 1 depicts relative total magnetic content thresholds for various denominations of genuine bills. Columns 1–5 represent varying degrees of sensitivity selectable by a user of a device employing the present invention. The values in Table 1 are set based on the scanning of genuine bills of varying denominations for total magnetic content and setting required thresholds based on the degree of sensitivity selected. The information in Table 1 is based on the total magnetic content of a genuine $1 being 1000. The following discussion is based on a sensitivity setting of 4. In this example it is assumed that magnetic content represents the second characteristic tested. If the comparison of first characteristic information, such as reflected light intensity, from a scanned billed and stored information corresponding to genuine bills results in an indication that the scanned bill is a $10 denomination, then the total magnetic content of the scanned bill is compared to the total magnetic content threshold of a genuine $10 bill, i.e., 200. If the magnetic content of the scanned bill is less than 200, the bill is rejected. Otherwise it is accepted as a $10 bill.

According to another feature of the present invention, the doubling or overlapping of bills in the transport system is detected by the provision of a pair of optical sensors which are co-linearly disposed opposite to each other within the scan head area along a line that is perpendicular to the direction of bill flow, i.e., parallel to the edge of test bills along their wide dimensions as the bills are transported across the optical scan head. The pair of optical sensors S1 and S2 (not shown) are co-linearly disposed within the scan head area in close parallelism with the wide dimension edges of incoming test bills. In effect, the optical sensors S1 and S2 (having corresponding light sources and photodetectors—not shown) are disposed opposite each other along a line within the scan head area which is perpendicular to the direction of bill flow. These sensors S1 and S2 serve as second detectors for detecting second characteristic information, namely density.

Although not illustrated in the drawings, it should be noted that corresponding photodetectors (not shown) are provided within the scanhead area in immediate opposition to the corresponding light sources and underneath the flat section of the transport path. These detectors detect the beam of coherent light directed downwardly onto the bill transport path from the light sources corresponding to the sensors S1 and S2 and generate an analog output which corresponds to the sensed light. Each such output is converted into a digital signal by a conventional ADC convertor unit (not shown) whose output is fed as a digital input to and processed by the system CPU (not shown), in a manner similar to that indicated in the arrangement of FIG. 4.

The presence of a bill which passes under the sensors S1 and S2 causes a change in the intensity of the detected light, and the corresponding change in the analog output of the detectors serves as a convenient means for density-based measurements for detecting the presence of "doubles" (two or more overlaid or overlapped bills) during the currency recognition and counting process. For instance, the sensors may be used to collect a predefined number of density measurements on a test bill, and the average density value for a bill may be compared to predetermined density thresholds (based, for instance, on standardized density readings for master bills) to determine the presence of overlaid bills or doubles. The above sensors and doubles detection technique is described in more detail in U.S. Pat. No. 5,295,196 which is incorporated herein by reference.

Figure 7:
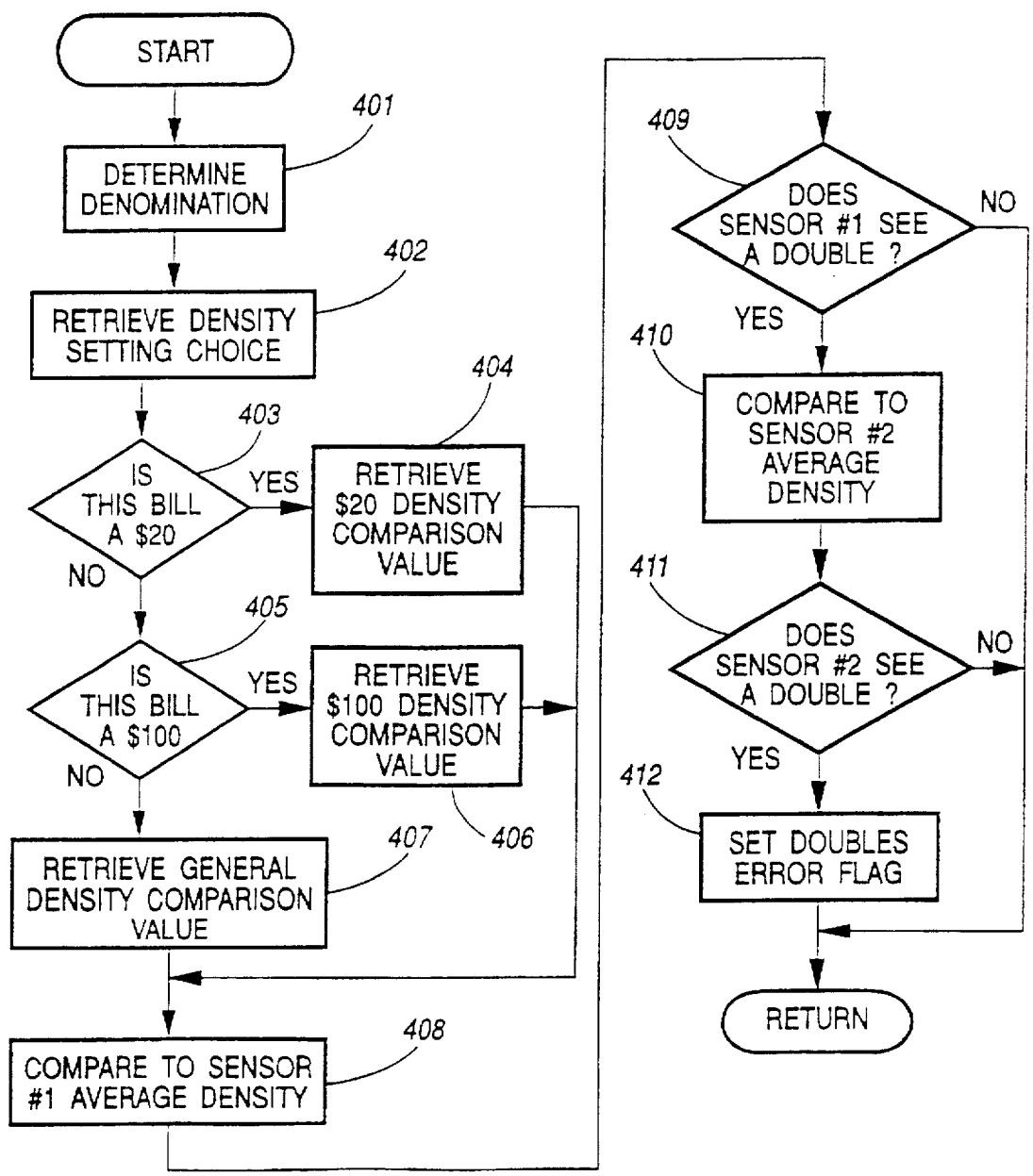
FIG. 7 is a flowchart illustrating the sequence of operations involved in implementing the detection of double or overlapping bills in the system of FIG. 4.

A routine for using the outputs of the two sensors S1 and S2 to detect any doubling or overlapping of bills determination of FIG. 7. This routine uses a determination of the denomination of a bill based on first characteristic information to streamline doubles detection wherein second characteristic information corresponds to the density of scanned bills. This routine starts when the denomination of a scanned bill has been determined via comparing first characteristic information at step 401, as described previously. To permit variations in the sensitivity of the density measurement, a "density setting choice" is retrieved from memory at step 402. The operator makes this choice manually, according to whether the bills being scanned are new bills, requiring a higher degree of sensitivity, or used bills, requiring a lower level of sensitivity. After the "density setting choice" has been retrieved, the system then proceeds through a series of steps which establish a density comparison value according to the denomination of the bill. Thus, step 403 determines whether the bill has been identified as a $20-bill, and if the answer is affirmative, the $20-bill density comparison value is retrieved from memory at step 404. A negative answer at step 443 advances the system to step 405 to determine whether the bill has been identified as a $100-bill, and if the answer is affirmative, the $100-bill density comparison value is retrieved from memory at step 406. A negative answer at step 405 advances the system to step 407 where a general density comparison value, for all remaining bill denominations, is retrieved from memory.

At step 408, the density comparison value retrieved at step 404, 406 or 407 is compared to the average density represented by the output of sensor S1. The result of this comparison is evaluated at step 409 to determine whether the output of sensor S1 identifies a doubling of bills for the particular denomination of bill determined at step 401. If the answer is negative, the system returns to the main program. If the answer is affirmative, step 410 then compares the retrieved density comparison value to the average density represented by the output of the second sensor S2. The result of this comparison is evaluated at step 411 to determine whether the output of sensor S2 identifies a doubling of bills. Affirmative answers at both step 409 and step 411 results in the setting of a "doubles error" flag at step 412, and the system then returns to the main program. The above doubles detection routine is described in more detail in U.S. Pat. No. 5,295,196 which is incorporated herein by reference. While the routine described above uses second characteristic information (density) to detect doubles, the above routine may be modified to authenticate bills based on their density, for example in a manner similar to that described in connection with Table 1.

Referring now to FIGS. 8a–8c, there is shown a side view of a preferred embodiment of a document authenticating system according to the present invention, a top view of the preferred embodiment of FIG. 8a along the direction 8b, and a top view of the preferred embodiment of FIG. 8a along the direction 8c, respectively. An ultraviolet ("UV") light source 802 illuminates a document 804. Depending upon the characteristics of the document, ultraviolet light may be reflected off the document and/or fluorescent light may be emitted from the document. A detection system 806 is positioned so as to receive any light reflected or emitted toward it but not to receive any UV light directly from the light source 802. The detection system 806 comprises a UV sensor 808, a fluorescence sensor 810, filters, and a plastic housing. The light source 802 and the detection system 806 are both mounted to a printed circuit board 812. The document 804 is transported in the direction indicated by arrow A by a transport system (not shown). The document is transported over a transport plate 814 which has a rectangular opening 816 in it to permit passage of light to and from the document. In a preferred embodiment of the present invention, the rectangular opening 816 is 1.375 inches (3.493 cm) by 0.375 inches (0.953 cm). To minimize dust accumulation onto the light source 802 and the detection system 806 and to prevent document jams, the opening 816 is covered with a transparent UV transmitting acrylic window 818. To further reduce dust accumulation, the UV light source 802 and the detection system 806 are completely enclosed within a housing (not shown) comprising the transport plate 814.

Figure 9:
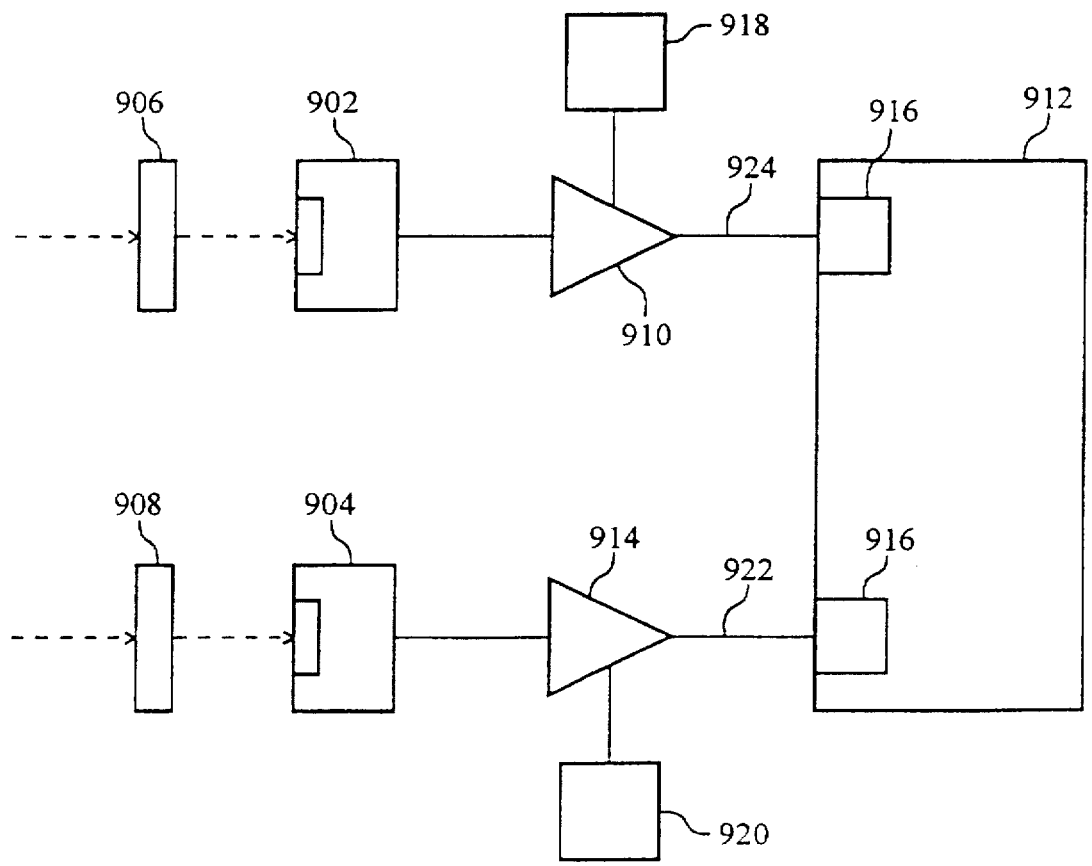
FIG. 9 is a functional block diagram illustrating a preferred embodiment of a document authenticating system according to the present invention.

Referring now to FIG. 9, there is shown a functional block diagram illustrating a preferred embodiment of a document authenticating system according to the present invention. FIG. 9 shows an UV sensor 902, a fluorescence sensor 904, and filters 906, 908 of a detection system such as the detection system 806 of FIG. 1. Light from the document passes through the filters 906, 908 before striking the sensors 902, 904, respectively. An ultraviolet filter 906 filters out visible light and permits UV light to be transmitted and hence to strike UV sensor 902. Similarly, a visible light filter 908 filters out UV light and permits visible light to be transmitted and hence to strike fluorescence sensor 904.

Accordingly, UV light, which has a wavelength below 400 nm, is prevented from striking the fluorescence sensor 904 and visible light, which has a wavelength greater than 400 nm, is prevented from striking the UV sensor 902. In a preferred embodiment the UV filter 906 transmits light having a wavelength between about 260 nm and about 380 nm and has a peak transmittance at 360 nm. In a preferred embodiment, the visible light filter 908 is a blue filter and preferably transmits light having a wavelength between about 415 nm and about 620 nm and has a peak transmittance at 450 nm. The above preferred blue filter comprises a combination of a blue component filter and a yellow component filter. The blue component filter transmits light having a wavelength between about 320 nm and about 620 nm and has a peak transmittance at 450 nm. The yellow component filter transmits light having a wavelength between about 415 nm and about 2800 nm. Examples of suitable filters are UG1 (UV filter), BG23 (blue bandpass filter), and GG420 (yellow longpass filter), all manufactured by Schott. In a preferred embodiment the filters are about 8 mm in diameter and about 1.5 mm thick.

The UV sensor 902 outputs an analog signal proportional to the amount of light incident thereon and this signal is amplified by amplifier 910 and fed to a microcontroller 912. Similarly, the fluorescence sensor 904 outputs an analog signal proportional to the amount of light incident thereon and this signal is amplified by amplifier 914 and fed to a microcontroller 912. Analog-to-digital converters 916 within the microcontroller 912 convert the signals from the amplifiers 910, 914 to digital and these digital signals are processed by the software of the microcontroller 912. The UV sensor 902 may be, for example, an ultraviolet enhanced photodiode sensitive to light having a wavelength of about 360 nm and the fluorescence sensor 904 may be a blue enhanced photodiode sensitive to light having a wavelength of about 450 nm. Such photodiodes are available from, for example, Advanced Photonix, Inc., Massachusetts. The microcontroller 912 may be, for example, a Motorola 68HC16.

The exact characteristics of the sensors 902, 904 and the filters 906, 908 including the wavelength transmittance ranges of the above filters are not as critical to the present invention as the prevention of the fluorescence sensor from generating an output signal in response to ultraviolet light and the ultraviolet sensor from generating an output signal in response to visible light. For example, instead of, or in addition to, filters, a authentication system according to the present invention may employ an ultraviolet sensor which is not responsive to light having a wavelength longer than 400 nm and/or a fluorescence sensor which is not responsive to light having a wavelength shorter than 400 nm.

Calibration potentiometers 918, 920 permit the gains of amplifiers 910, 914 to be adjusted to appropriate levels. Calibration may be performed by positioning a piece of white fluorescent paper on the transport plate 814 so that it completely covers the rectangular opening 816 of FIG. 1. The potentiometers 918, 920 may then be adjusted so that the output of the amplifiers 910, 914 is 5 volts. Alternatively, calibration may be performed using genuine currency such as a piece of genuine U.S. currency. Potentiometers 918 and 920 may be replaced with electronic potentiometers located, for example, within the microcontroller 912. Such electronic potentiometers may permit automatic calibration based on the processing of a single genuine document or a plurality of documents as will be described below.

The implementation of a preferred embodiment of a document authenticating system according to the present invention as illustrated in FIG. 9 with respect to the authentication of U.S. currency will now be described. As discussed above, it has been determined that genuine U.S. currency reflects a high level of ultraviolet light and does not fluoresce under ultraviolet illumination. It has also been determined that under ultraviolet illumination counterfeit United States currency exhibits one of the four sets of characteristics listed below:

1) Reflects a low level of ultraviolet light and fluoresces;
2) Reflects a low level of ultraviolet light and does not fluoresce;
3) Reflects a high level of ultraviolet light and fluoresces;
4) Reflects a high level of ultraviolet light and does not fluoresce.

Counterfeit bills in categories (1) and (2) may be detected by a currency authenticator employing an ultraviolet light reflection test according to a preferred embodiment of the present invention. Counterfeit bills in category (3) may be detected by a currency authenticator employing both an ultraviolet reflection test and a fluorescence test according to another preferred embodiment of the present invention. Only counterfeits in category (4) are not detected by the authenticating methods of the present invention.

According to a preferred embodiment of the present invention, fluorescence is determined by any signal that is above the noise floor. Thus, the amplified fluorescent sensor signal 922 will be approximately 0 volts for genuine U.S. currency and will vary between approximately 0 and 5 volts for counterfeit bills depending upon their fluorescent characteristics. Accordingly, an authenticating system according to a preferred embodiment of the present invention will reject bills when signal 922 exceeds approximately 0 volts.

According to a preferred embodiment of the present invention, a high level of reflected UV light ("high UV") is indicated when the amplified UV sensor signal 924 is above a predetermined threshold. The high/low UV threshold is a function of lamp intensity and reflectance. Lamp intensity can degrade by as much as 50% over the life of the lamp and can be further attenuated by dust accumulation on the lamp and the sensors. The problem of dust accumulation is mitigated by enclosing the lamp and sensors in a housing as discussed above. An authenticating system according to a preferred embodiment of the present invention tracks the intensity of the UV light source and readjusts the high/low threshold accordingly. The degradation of the UV light source may be compensated for by periodically feeding a genuine bill into the system, sampling the output of the UV sensor, and adjusting the threshold accordingly. Alternatively, degradation may be compensated for by periodically sampling the output of the UV sensor when no bill is present in the rectangular opening 816 of the transport plate 814. It is noted that a certain amount of UV light is always reflected off the acrylic window 818. By periodically sampling the output of the UV sensor when no bill is present, the system can compensate for light source degradation. Furthermore, such sampling could also be used to indicate to the operator of the system when the ultraviolet light source has burned out or otherwise requires replacement. This may be accomplished, for example, by means of a display reading or an illuminated light emitting diode ("LED"). The amplified ultraviolet sensor signal 924 will initially vary between 1.0 and 5.0 volts depending upon the UV reflectance characteristics of the document being scanned and will slowly drift downward as the light source degrades. In an alternative preferred embodiment to a preferred embodiment wherein the threshold level is adjusted as the light source degrades, the sampling of the UV sensor output may be used to adjust the gain of the amplifier 910 thereby maintaining the output of the amplifier 910 at its initial levels.

It has been found that the voltage ratio between counterfeit and genuine U.S. bills varies from a discernable 2-to-1 ratio to a non-discernable ratio. According to a preferred embodiment of the present invention a 2-to-1 ratio is used to discriminate between genuine and counterfeit bills. For example, if a genuine U.S. bill generates an amplified UV output sensor signal 924 of 4.0 volts, documents generating an amplified UV output sensor signal 924 of 2.0 volts or less will be rejected as counterfeit. As described above, this threshold of 2.0 volts may either be lowered as the light source degrades or the gain of the amplifier 910 may be adjusted so that 2.0 volts remains an appropriate threshold value.

According to a preferred embodiment of the present invention, the determination of whether the level of UV reflected off a document is high or low is made by sampling the output of the UV sensor at a number of intervals, averaging the readings, and comparing the average level with the predetermined high/low threshold. Alternatively, a comparison may be made by measuring the amount of UV light reflected at a number of locations on the bill and comparing these measurements with those obtained from genuine bills. Alternatively, the output of one or more UV sensors may be processed to generate one or more patterns of reflected UV light and these patterns may be compared to the patterns generated by genuine bills. Such a pattern generation and comparison technique may be performed by modifying an optical pattern technique such as that disclosed in U.S. Pat. No. 5,295,196 incorporated herein by reference in its entirety or in U.S. patent application Ser. No. 08/287,882 filed Aug. 9, 1994 for a "Method and Apparatus for Document Identification," incorporated herein by reference in its entirety.

In a similar manner, the presence of fluorescence may be performed by sampling the output of the fluorescence sensor at a number of intervals. However, in a preferred embodiment, a bill is rejected as counterfeit U.S. currency if any of the sampled outputs rise above the noise floor. However, the alternative methods discussed above with respect to processing the signal or signals of a UV sensor or sensors may also be employed, especially with respect to currencies of other countries or other types of documents which may employ as security features certain locations or patterns of fluorescent materials.

A currency authenticating system according to the present invention may be provided with means, such as a display, to indicate to the operator the reasons why a document has been rejected, e.g., messages such as "UV FAILURE" or "FLUORESCENCE FAILURE." A currency authenticating system according to the present invention may also permit the operator to selectively choose to activate or deactivate either the UV reflection test or the fluorescence test or both. A currency authenticating system according to the present invention may also be provided with means for adjusting the sensitivities of the UV reflection and/or fluorescence test, for example, by adjusting the respective thresholds. For example, in the case of U.S. currency, a system according to the present invention may permit the high/low threshold to be adjusted, for example, either in absolute voltage terms or in genuine/suspect ratio terms.

The UV and fluorescence authentication test may be incorporated into various document handlers such as currency counters and/or currency denomination discriminators such as that disclosed in connection with FIG. 4 and U.S. Pat. No. 5,295,196 incorporated herein by reference in its entirety. Likewise, the magnetic authentication tests described above may likewise be incorporated in such counters and/or discriminators. In such systems, calibration may be performed by processing a stack of genuine documents. An example of a method of calibrating such a device will now be discussed.

As mentioned above, the acrylic window 818 reflects a certain amount of UV light even when no bill is present. The amount of UV light reflected in the absence of bills is measured. A stack of genuine bills may then be processed with the potentiometer 918 set to some arbitrary value and the resulting UV readings averaged. The difference between the average reading and the reading made in the absence of bills may then be calculated. The potentiometer 918 may then be adjusted so that the average reading would be at least 0.7 volts greater then the no bill reading. It is also desirable to adjust the potentiometer 918 so that the amplifier 910 operates around the middle of its operating range. For example, if a reading of 1.0 volt results when no bills are present and an average reading of 3.0 volts results when a stack of genuine bills are processed, the resulting difference is 2.0 volts which is greater than 0.7 volts. However, it is desirable for the amplifier to be operating in the range of about 2.0 to 2.5 volts and preferably at about 2.0 volts. Thus in the above example, the potentiometer 918 may be used to adjust the gain of the amplifier 910 so that an average reading of 2.0 volts would result. Where potentiometer 918 is an electronic potentiometer, the gain of the amplifier 910 may be automatically adjusted by the microcontroller 912. In general, when the average reading is too high the potentiometer is adjusted to lower the resulting values to the center of the operating range of the amplifier and vice versa when the average reading is too low.

According to another embodiment of the present invention, the operator of a document handling device such as a currency counter or a currency denomination discriminator is provided with the ability to adjust the sensitivity of a UV reflection test, a fluorescence test, and a magnetic test. For example, a note counter embodying a preferred embodiment of the present invention may provide the operator the ability to set the authentication tests to a high or a low sensitivity. For example, the note counter may be provided with a set up mode which enables the operator to adjust the sensitivities for each of the above tests for both the high and the low modes. This may be achieved through appropriate messages being displayed on, for example, display 82 of FIG. 4 and the input of selection choices via an input device such as a keyboard or buttons. In one embodiment, the device permits the operator to adjust the UV test, the fluorescent test, and the magnetic test in a range of sensitivities 1–7, with 7 being the most sensitive, or to turn each test off. The device permits setting the sensitivity as described above for the three authentication tests for both a low sensitivity (low denomination) mode and a high sensitivity (high denomination) mode. The above setting options are summarized in Table 2.

TABLE 2

| Mode | UV Test Sensitivity | Fluorescent Test Sensitivity | Magnetic Test Sensitivity |
|---|---|---|---|
| High | off, 1–7 | off, 1–7 | off, 1–7 |
| Low | off, 1–7 | off, 1–7 | off, 1–7 |

According to an alternate embodiment, the above high/low modes are replaced with denomination modes, for example, one for each of several denominations of currency (e.g., $1, $2, $5, $10, $20, $50 and $100). For each denomination, the sensitivity of the three tests may be adjusted between 1–7 or off. According to one embodiment for operator manually selects either the high or low mode or the appropriate denomination mode based on the values of the notes to be processed. This manual mode selection system may be employed in, for example, either a note counter or a currency denomination discriminator. According to another embodiment the document handling system automatically selects either the high or low mode or the appropriate denomination mode based on the values of the notes being processed. This automatic mode selection system may be employed in systems capable of identifying the different values or kinds of documents, for example, a currency denomination discriminator.

Accordingly, in the low mode or for low denomination modes (e.g., $1, $2) the three tests may be set to relatively low sensitivities (e.g., UV test set at 2, fluorescent test set at 5, and magnetic test set at 3). Conversely, in the high mode or for high denomination modes (e.g., $50, $100) the three tests may be set to relatively high sensitivities (e.g., UV test set at 5, fluorescent test set at 6, and magnetic test set at 7). In this way, authentication sensitivity may be increased when processing high value notes where the potential harm or risk in not detecting a counterfeit may be greater and may be decreased when processing low value notes where the potential harm or risk in not detecting a counterfeit is lesser and the annoyance of wrongly rejecting genuine notes is greater. Also the UV, fluorescent, and/or magnetic characteristics of genuine notes can vary due to number of factors such wear and tear or whether the note has been washed (e.g., detergents). As a result, the fluorescent detection of genuine U.S. currency, for example, may yield readings of about 0.05 or 0.06 volts.

The UV and fluorescent thresholds associated with each of the seven sensitivity levels may be set, for example, as shown in Table 3.

TABLE 3

| Sensitivity Level | UV Test (Volts) | Fluorescent Test (Volts) |
| --- | --- | --- |
| 1 | 0.2 | 0.7 |
| 2 | 0.3 | 0.6 |
| 3 | 0.4 | 0.5 |
| 4 | 0.5 | 0.3 |
| 5 | 0.55 | 0.2 |
| 6 | 0.6 | 0.15 |
| 7 | 0.7 | 0.1 |

In performing the UV test according to one embodiment, the no bill reflectance value is subtracted from resulting UV reflectance voltages associated with the scanning of a particular bill, and this difference is compared against the appropriate threshold value such as those in Table 3 in determining whether to reject a bill.

According to one embodiment, the potentiometer 920 associated with the fluorescence detector 204 is calibrated by processing a genuine note or stack of notes, as described above in connection with the calibration of the UV detector, and adjusted so that a reading of near 0 volts (e.g., about 0.1 volt) results. Magnetic calibration may be performed, for example, manually in conjunction with the processing of a genuine bill of known magnetic characteristics and adjusting the magnetic sensor to near the center of its range.

Upon a bill failing one or more of the above tests, an appropriate error message may be displayed such as "Suspect Document U--" for failure of the UV reflection test, "Suspect Document -F-" for failure of the fluorescent test, "Suspect Document --M" for failure of the magnetic test, or some combination thereof when more than one test is failed (e.g., "Suspect Document UF-" for failure of both the UV reflection test and the fluorescent test).

While the present invention has been described with reference to one or more particular embodiments, those skilled in the art will recognize that many changes may be made thereto without departing from the spirit and scope of the present invention, which is set forth in the following claims.

We claim:

1. A currency evaluation device comprising a detection circuitry for detecting first characteristic information and second characteristic information from a scanned bill;

pattern generation means for generating a first characteristic scanned pattern associated with said detected first characteristic information;

a memory for storing (1) at least one first characteristic master pattern associated with first characteristic information for each of a plurality of recognizable denominations of genuine bills;

(2) at least one set of genuine second characteristic information for each of said plurality of recognizable denominations of genuine bills; and a signal processing means for (1) performing a first comparison whereby at least a portion of said scanned pattern is compared with at least a portion of at least one of said master patterns;

(2) determining and indicating the denomination of said scanned bill when said scanned bill is one of said plurality of recognizable denominations based on said first comparison when the results of said first comparison satisfy a first criteria otherwise indicating an error when the results of said first comparison fail to satisfy said first criteria;

(3) retrieving at least a portion of at least one of said sets of genuine second characteristic information corresponding only to the denomination indicated by said first comparison regardless of which of said plurality of recognizable denominations said scanned bill is determined to be based on said first comparison;

(4) performing a second comparison whereby at least a portion of said detected second characteristic information is compared with said retrieved genuine second characteristic information; and (5) indicating the genuineness of said scanned bill based on said second comparison when the results of said second comparison satisfy a second criteria, otherwise indicating an error when the results of said second comparison fail to satisfy said second criteria.

2. A currency evaluation device according to claim 1 wherein said detection circuitry employs at least one detector selected from the group consisting of: optical, magnetic, electrical conductivity, capacitive, and mechanical sensors.

3. The device according to claim 1 wherein said first characteristic information is color information.

4. The device according to claim 1 wherein said second characteristic information is color information.

5. A currency evaluation device comprising a detection circuitry for detecting first characteristic information and second characteristic information from a scanned bill, wherein said first characteristic information is optically sensed;

pattern generation means for generating a first characteristic optically scanned pattern associated with said detected first characteristic information;

a memory for storing
(1) at least one first characteristic master pattern associated with first characteristic information for genuine bills of different denominations;
(2) sets of genuine second characteristic information for genuine bills of said different denominations; and a signal processing means for
(1) receiving said first characteristic optically scanned pattern and detected second characteristic information;
(2) performing a first comparison whereby at least a portion of said scanned pattern is compared with at least a portion of at least one of said master patterns;
(3) determining and indicating the denomination of said scanned bill based on said first comparison when the results of said first comparison satisfy a first criteria, otherwise indicating an error when the results of said first comparison fail to satisfy said first criteria, wherein said signal processing means is capable of determining the denomination of said scanned bill when said scanned bill is any one of said different denominations based solely on said first characteristic information and without reference to said second characteristic information regardless which one of said different denominations said scanned bill is;
(4) performing a second comparison after performing said first comparison whereby at least a portion of said detected second characteristic information is compared with at least a portion of said sets of genuine second characteristic information corresponding only to the denomination indicated by said first comparison regardless of which of said different denominations said scanned bill is determined to be based on said first comparison; and
(5) indicating the genuineness of said scanned bill on said second comparison when the results of said second comparison satisfy a second criteria, otherwise indicating an error when the results of said second comparison fail to satisfy said second criteria.

6. The currency evaluation device according to claim 5 wherein said detection circuitry comprises a first detector for detecting said first characteristic information from said scanned bill and a second detector for detecting said second characteristic information of said scanned bill.

7. The device according to claim 5 wherein said first characteristic information is color information.

8. The device according to claim 5 wherein said second characteristic information is color information.

9. A currency evaluation device comprising a detection circuitry for detecting first characteristic information and second characteristic information from a scanned bill, wherein said first characteristic information is optically sensed;

pattern generation means for generating a first characteristic optically scanned pattern associated with said detected first characteristic information;

a memory for storing
(1) at least one first characteristic master pattern associated with first characteristic information for each of a plurality of denominations of genuine bills;
(2) at least one set of genuine second characteristic information for each of said plurality of denominations of genuine bills; and a signal processing means for
(1) performing a first comparison whereby at least a portion of said scanned pattern is compared with at least a portion of at least one of said master patterns;
(2) determining and indicating the denomination of said scanned bill based on said first comparison when the results of said first comparison satisfy a first criteria, otherwise indicating an error when the results of said first comparison fail to satisfy said first criteria, wherein said signal processing means is capable of determining the denomination of said scanned bill when said scanned bill is any one of said plurality of denominations based solely on said first characteristic information and without reference to said second characteristic information regardless which one of said plurality of denominations said scanned bill is;
(3) performing a second comparison after performing said first comparison whereby at least a portion of said detected second characteristic information is compared with at least a portion of at least one of said sets of genuine second characteristic information corresponding only to the denomination indicated by said first comparison regardless of which of said plurality of denominations said scanned bill is determined to be based on said first comparison; and
(4) indicating the genuineness of said scanned bill based on said second comparison when the results of said second comparison satisfy a second criteria, otherwise indicating an error when the results of said second comparison fail to satisfy said second criteria.

10. The device according to claim 9 wherein the first characteristic information is reflected light intensity information.

11. The device according to claim 10 wherein the second characteristic information is color information.

12. The device according to claim 9 wherein said memory stores at least two first characteristic master patterns and sets of genuine second characteristic information for each of said plurality of denominations, at least one master pattern or set corresponding to a scan in the forward direction and at least one master pattern or set corresponding to a scan in the reverse direction.

13. The device according to claim 9 wherein said first characteristic information is color information.

14. The device according to claim 9 wherein said second characteristic information is color information.

15. A currency evaluation device comprising detection circuitry for obtaining
(1) a first set of scanned data values indicating a first measurable characteristic at successive locations along a portion of a scanned bill, said first measurable characteristic being the intensity of light reflected from said scanned bill, said first set of scanned data values representing a first characteristic scanned pattern;
(2) a second set of one or more scanned data values indicating a second measurable characteristic of said scanned bill;

a memory for storing
(1) first characteristic master patterns indicating said first measurable characteristic at successive locations along corresponding portions of genuine bills of a plurality of denominations, said plurality of denominations corresponding to the denominations the device is capable of discriminating;

(2) second sets of data values indicating said second measurable characteristic of genuine bills of said plurality of denominations; and processing means for (1) performing a first comparison whereby at least a portion of said first characteristic scanned pattern is compared with at least a portion of said first characteristic master patterns;

(2) determining and indicating the denomination of said scanned bill based on the results of said first comparison when the results of said first comparison satisfy a first criteria, otherwise indicating an error when the results of said first comparison fail to satisfy said first criteria, wherein said processing means is capable of determining the denomination of said scanned bill when said scanned bill is any one of said plurality of denominations that the device is capable of discriminating based solely on said first characteristic information and without reference to said second characteristic information regardless which one of said plurality of denominations said scanned bill is;

(3) conditionally performing a second comparison after performing said first comparison provided said first comparison does not result in an error whereby at least a portion of said second set of scanned data values are compared with at least a portion of said second set of stored data values corresponding only to a genuine bill of the denomination indicated by said first comparison regardless of which of said plurality of denominations said scanned bill is determined to be based on said first comparison; and (4) indicating the genuineness of a scanned bill based on the results of said second comparison when the results of said second comparison satisfy a second criteria, otherwise indicating an error when the results of said second comparison fail to satisfy said second criteria.

16. The device according to claim 15 wherein said second characteristic information is color information.

17. A currency evaluation device comprising a light source for illuminating a strip of a preselected segment of a scanned bill;

a first detector for detecting first characteristic information from said scanned bill, said first characteristic information being the intensity of light reflected from said scanned bill, said first detector receiving reflected light from the illuminated strip on said scanned bill and producing a first scanned signal representing variations in the intensity of the reflected light;

a second detector producing a second scanned signal responsive to second characteristic information of said scanned bill;

means for sampling said first scanned signal at preselected intervals, each of said first scanned signal samples being proportional to the intensity of the light reflected from a different strip of said preselected segment of said scanned bill, said scanned signal samples, collectively, representing a first characteristic optically scanned pattern;

a memory for storing (1) sets of stored intensity signal samples for genuine bills of different denominations, each of said stored intensity signal samples being proportional to the intensity of the light reflected from a different strip of said preselected segment of a genuine bill of a given denomination, each set of said stored intensity signal samples representing a master pattern;

(2) sets of stored second characteristic information for genuine bills of said different denominations;

a first signal processing means for (1) receiving said first scanned pattern;

(2) comparing at least a portion of said first scanned pattern with at least a portion of at least one of said master patterns;

(3) determining and indicating the denomination of a scanned bill for a scanned bill based on the comparison of said first scanned signal samples with said sets of stored intensity signal samples when the results of said first scanned signal samples comparison satisfy a first criteria, otherwise indicating a denomination non-match error, wherein said first signal processing means is capable of determining the denomination of said scanned bill when said scanned bill is any one of said different denominations based solely on said first characteristic information and without reference to said second characteristic information regardless which one of said different denominations said scanned bill is; and a second signal processing means for (1) receiving said second scanned signal responsive to said second characteristic of said scanned bill;

(2) comparing at least a portion of said second scanned signal with at least of portion of said stored second characteristic information corresponding only to a genuine bill of the denomination indicated by said first processing means regardless of which of said different denominations said scanned bill is determined to be based on said first comparison;

(3) indicating the genuineness of a scanned bill based on the comparison of said second scanned signal with said stored second characteristic information when the results of said second scanned signal comparison satisfy a second criteria, otherwise indicating a second characteristic non-match error.

18. The device according to claim 17 wherein said second characteristic information is color information.

19. A currency evaluation device comprising a bill separating station for receiving currency bills from a bill accepting station and feeding said bills, one at a time, to a bill transport mechanism, said bill transport mechanism transporting bills from said bill separating station to a stacking station;

an optical scanning head located between said bill separating and stacking stations for scanning a preselected segment of each bill transported between said stations by said transport mechanism, said scanning head including at least one light source for illuminating a strip of said preselected segment of a bill, at least one intensity detector and a plurality of color detectors for receiving reflected light from the illuminated strip on said scanned bill, and a focusing means for focusing the reflected light on said color detectors, said intensity detector producing an intensity output signal representing variations in the intensity of the reflected light, and each of said plurality of color detectors having a color filter disposed thereon and producing a plurality of color output signals representing variations in the intensity of the reflected light transmitted through said color filters;

means for sampling said intensity output signal and said color output signals at preselected intervals as a bill is moved across said scanning head, each of said intensity and color output signal samples being proportional to the intensity of the light reflected from a different strip of said preselected segment of a bill;

a memory for storing characteristic intensity and color signal samples produced by scanning said preselected segments of genuine bills of different denominations with said scanning head and sampling said intensity and color output signals at said preselected intervals, each of said stored signal samples being proportional to the intensity of the light reflected from a different strip of said preselected segment of a bill and received by said intensity and color detectors;

signal processing means for receiving said output intensity and color signal samples and (1) determining the denomination of each scanned bill by comparing said stored intensity signal samples with said intensity output signal samples produced by the scanning of each bill with said scanning head, (2) authenticating the genuineness of each scanned bill by comparing said stored color signal samples for the denomination determined by the previous step with said color output signal samples produced by the scanning of each bill with said scanning head, and (3) rejecting each of said scanned bills whose genuineness is not authenticated either because a non-match of intensity signal comparisons in determining a denomination or because of a non-match of color signal comparisons.

20. A currency counting and evaluation device for receiving a stack of currency bills, rapidly counting and evaluating all the bills in the stack, and then restacking the bills, said device comprising a bill separating station for receiving a stack of currency bills and feeding said bills in the direction of the narrow dimension of the bills, one at a time, to a bill transport mechanism, said bill transport mechanism transporting bills, in the direction of the narrow dimension of the bills, from said bill separating station to a stacking station, at a rate in excess of about 800 bills per minute;

a stationary optical scanning head located between said bill separating and stacking stations for scanning a preselected segment of a central portion of each bill transported between said stations by said transport mechanism, said scanning head including at least one light source for illuminating a strip of said preselected segment of a bill, at least one intensity detector and a plurality of color detectors for receiving reflected light from the illuminated strip on said scanned bill, and a focusing means for focusing the reflected light on said color detectors, said intensity detector producing an intensity output signal representing variations in the intensity of the reflected light, and each of said plurality of color detectors having a color filter disposed thereon and producing a plurality of color output signals representing variations in the intensity of the reflected light transmitted through said color filters;

means for sampling said intensity output signal and said color output signals at preselected intervals as a bill is moved across said scanning head in the direction of the narrow dimension of the bill, each of said intensity and color output signal samples being proportional to the intensity of the light reflected from a different strip of said preselected segment of a bill;

a memory for storing characteristic intensity and color signal samples produced by scanning said preselected segments of genuine bills of different denominations with said scanning head and sampling said intensity and color output signals at said preselected intervals, each of said stored signal samples being proportional to the intensity of the light reflected from a different strip of said preselected segment of a bill and received by said intensity and color detectors;

signal processing means for receiving said output intensity and color signal samples and (1) determining the denomination of each scanned bill by comparing said stored intensity signal samples with said intensity output signal samples produced by the scanning of each bill with said scanning head, (2) authenticating the genuineness of each scanned bill by comparing said stored color signal samples corresponding to the denomination indicated by the previous step with said color output signal samples produced by the scanning of each bill with said scanning head, (3) counting the number of authenticated scanned bills of each denomination, (4) accumulating the cumulative value of the authenticated scanned bills of each denomination, and (5) rejecting each of said scanned bills whose genuineness is not authenticated either because a non-match of intensity signal comparisons in determining a denomination or because of a non-match of color signal comparisons.

21. A currency evaluation device comprising a detection circuitry for detecting first characteristic information and second characteristic information from a scanned bill;

pattern generation means for generating a first characteristic scanned pattern associated with said detected first characteristic information;

a memory for storing
   (1) at least one first characteristic master pattern associated with first characteristic information for each of a plurality of recognizable denominations of genuine bills;
   (2) at least one set of genuine second characteristic information for each of said plurality of recognizable denominations of genuine bills; and a signal processing means for
   (1) performing a first comparison whereby at least a portion of said scanned pattern is compared with master patterns associated with each of said plurality of recognizable denominations;
   (2) generating a correlation number associated with each of said master patterns to with which said scanned pattern is compared, each of said correlation numbers being indicative of the degree of similarity between a respective master pattern and said scanned pattern;
   (3) determining the denomination associated with the master pattern having the highest correlation number;
   (4) calling the denomination of said scanned bill to be the denomination associated with the master pattern having the highest correlation number if the highest correlation number exceeds a first threshold, otherwise indicating an error;
   (5) retrieving at least a portion of at least one of said sets of genuine second characteristic information corresponding only to the denomination called regardless of which of said plurality of recognizable denominations said scanned bill is called to be;
   (6) performing a second comparison whereby at least a portion of said detected second characteristic information is compared with said retrieved genuine second characteristic information; and (7) indicating the genuineness of said scanned bill based on said second comparison when the results of said second comparison satisfy a second criteria, otherwise indicating an error when the results of said second comparison fail to satisfy said second criteria.

22. A currency evaluation device comprising a detection circuitry for detecting first characteristic information and second characteristic information from a scanned bill;

pattern generation means for generating a first characteristic scanned pattern associated with said detected first characteristic information;

a memory for storing
(1) at least one first characteristic master pattern associated with first characteristic information for each of a plurality of recognizable denominations of genuine bills;
(2) at least one set of genuine second characteristic information for each of said plurality of recognizable denominations of genuine bills; and a signal processing means for
(1) performing a first comparison whereby at least a portion of said scanned pattern is compared with master patterns associated with each of said plurality of recognizable denominations;
(2) determining the degree of correlation between said scanned pattern and each of said master patterns to with which said scanned pattern is compared;
(3) determining the denomination associated with the master pattern having the greatest degree of correlation;
(4) calling the denomination of said scanned bill to be the denomination associated with the master pattern having the greatest degree of correlation if the degree of correlation satisfies a first criteria, otherwise indicating an error;
(5) retrieving at least a portion of at least one of said sets of genuine second characteristic information corresponding only to the denomination called regardless of which of said plurality of recognizable denominations said scanned bill is called to be;
(6) performing a second comparison whereby at least a portion of said detected second characteristic information is compared with said retrieved genuine second characteristic information; and
(7) indicating the genuineness of said scanned bill based on said second comparison when the results of said second comparison satisfy a second criteria, otherwise indicating an error when the results of said second comparison fail to satisfy said second criteria.

23. A currency evaluation device comprising a detection circuitry for detecting first characteristic information and second characteristic information from a scanned bill;

pattern generation means for generating a first characteristic scanned pattern associated with said detected first characteristic information;

a memory for storing
(1) at least one first characteristic master pattern associated with first characteristic information for each of a plurality of recognizable denominations of genuine bills;
(2) at least one set of genuine second characteristic information for each of said plurality of recognizable denominations of genuine bills; and a signal processing means for
(1) calling the denomination of said scanned bill whereby
(a) at least a portion of said scanned pattern is compared with master patterns associated with each of said plurality of recognizable denominations;
(b) the degree of correlation between said scanned pattern and each of said master patterns to with which said scanned pattern is compared is determined;
(c) the denomination associated with the master pattern having the greatest degree of correlation is determined; and
(d) the denomination of said scanned bill is called to be the denomination associated with the master pattern having the greatest degree of correlation if the degree of correlation satisfies a first criteria, otherwise an error is indicated.
(2) retrieving at least a portion of at least one of said sets of genuine second characteristic information corresponding only to the denomination called regardless of which of said plurality of recognizable denominations said scanned bill is called to be;
(3) performing a second comparison whereby
(a) at least a portion of said detected second characteristic information is compared with said retrieved genuine second characteristic information; and
(b) the genuineness of said scanned bill is indicated based on said second comparison when the results of said second comparison satisfy a second criteria, otherwise an error is indicated when the results of said second comparison fail to satisfy said second criteria.

24. A method for discriminating between currency bills of different denominations and authenticating the bills using a currency evaluation device having a memory in which first characteristic master patterns associated with first characteristic information for genuine bills of different denominations and sets of genuine second characteristic information for genuine bills of said different denominations is stored; comprising the steps of:

detecting first characteristic information from a scanned bill;

detecting second characteristic information from said scanned bill;

generating a first characteristic scanned pattern associated with said detected first characteristic information;

comparing at least a portion of said scanned pattern with first characteristic master patterns associated with each of the bills of the different denominations;

determining the degree of correlation between said scanned pattern and each of said master patterns to which said scanned pattern is compared;

determining the denomination associated with the master pattern having the greatest degree of correlation;

calling the denomination of said scanned bill to be the denomination associated with the master pattern having the greatest degree of correlation if the greatest degree of correlation satisfies a first criteria;

comparing at least a portion of at least one of said sets of genuine second characteristic information corresponding only to the denomination called regardless of which of said plurality of recognizable denominations said scanned bill is called to be with at least a portion of said detected second characteristic information; and indicating the genuineness of said scanned bill based on said step of comparing second characteristic information when the results of said second comparing step satisfy a second criteria.

25. The method of claim 24 further comprising the steps of:

indicating an error if the greatest degree of correlation fails to satisfy said first criteria; and indicating an error when the results of said second comparing step fail to satisfy said second criteria.

* * * * *